(12) United States Patent
Billa et al.

(10) Patent No.: US 10,656,949 B2
(45) Date of Patent: May 19, 2020

(54) INSTRUCTION-BASED NON-DETERMINISTIC FINITE STATE AUTOMATA ACCELERATOR

(71) Applicant: Fungible, Inc., Santa Clara, CA (US)

(72) Inventors: Satyanarayana Lakshmipathi Billa, Sunnyvale, CA (US); Rajan Goyal, Saratoga, CA (US); Abhishek Kumar Dikshit, Fremont, CA (US); Yi-Hua Edward Yang, San Jose, CA (US); Sandipkumar J. Ladhani, Austin, TX (US)

(73) Assignee: Fungible, Inc., Santa Clara, CA (US)

( * ) Notice: Subject to any disclaimer, the term of this patent is extended or adjusted under 35 U.S.C. 154(b) by 69 days.

(21) Appl. No.: 16/035,478

(22) Filed: Jul. 13, 2018

(65) Prior Publication Data

US 2020/0019404 A1    Jan. 16, 2020

(51) Int. Cl.
*G06F 9/32* (2018.01)
*G06F 9/38* (2018.01)

(52) U.S. Cl.
CPC ............ *G06F 9/321* (2013.01); *G06F 9/3802* (2013.01)

(58) Field of Classification Search
CPC .............................. G06F 9/321; G06F 9/3802
See application file for complete search history.

(56) References Cited

U.S. PATENT DOCUMENTS

| | | |
|---|---|---|
| 6,191,782 B1 | 2/2001 | Mori et al. |
| 7,308,446 B1 | 12/2007 | Panigrahy et al. |
| 7,805,392 B1 * | 9/2010 | Steele .................. G06F 21/564 706/48 |
| 7,949,683 B2 | 5/2011 | Goyal |
| 8,055,601 B2 | 11/2011 | Pandya |
| 8,086,609 B2 | 12/2011 | Goyal et al. |
| 8,176,300 B2 | 5/2012 | Goyal et al. |

(Continued)

FOREIGN PATENT DOCUMENTS

| | | |
|---|---|---|
| DE | 112012002624 T5 | 4/2014 |
| EP | 2215563 A1 | 8/2010 |

(Continued)

OTHER PUBLICATIONS

U.S. Appl. No. 16/035,416, filed Jul. 13, 2018, naming inventors Goyal et al.

(Continued)

*Primary Examiner* — Farley Abad
(74) *Attorney, Agent, or Firm* — Shumaker & Sieffer, P.A.

(57) ABSTRACT

An example processing device includes a memory including a non-deterministic finite automata (NFA) buffer configured to store a plurality of instructions defining an ordered sequence of instructions of at least a portion of an NFA graph, the portion of the NFA graph comprising a plurality of nodes arranged along a plurality of paths. The NFA engine determines a current symbol and one or more subsequent symbols of a payload segment that satisfy a match condition specified by a subset of instructions of the plurality of instructions for a path of the plurality of paths and in response to determining the current symbol and the one or more subsequent symbols of the payload segment that satisfy the match condition, outputs an indication that the payload data has resulted in a match.

42 Claims, 16 Drawing Sheets

(56) References Cited

U.S. PATENT DOCUMENTS

| | | | |
|---|---|---|---|
| 8,180,803 B2 | 5/2012 | Goyal | |
| 8,473,523 B2 | 1/2013 | Goyal | |
| 8,426,165 B2 | 4/2013 | Cho et al. | |
| 8,516,456 B1 * | 8/2013 | Starovoitov | G06F 8/427 717/141 |
| 8,726,253 B2 | 5/2014 | Glendenning et al. | |
| 8,819,217 B2 | 8/2014 | Hussain et al. | |
| 8,886,680 B2 | 11/2014 | Goyal | |
| 8,990,259 B2 | 3/2015 | Billa et al. | |
| 9,083,740 B1 | 7/2015 | Ma et al. | |
| 9,203,805 B2 | 12/2015 | Goyal et al. | |
| 9,304,768 B2 | 4/2016 | Ruehle | |
| 9,419,943 B2 | 8/2016 | Goyal et al. | |
| 9,426,165 B2 | 8/2016 | Billa et al. | |
| 9,426,166 B2 | 8/2016 | Billa et al. | |
| 9,438,561 B2 | 9/2016 | Goyal et al. | |
| 9,495,479 B2 | 11/2016 | Goyal | |
| 9,507,563 B2 | 11/2016 | Billa et al. | |
| 9,514,246 B2 | 12/2016 | Billa et al. | |
| 9,563,399 B2 | 2/2017 | Goyal et al. | |
| 9,602,532 B2 | 3/2017 | Goyal et al. | |
| 9,762,544 B2 | 9/2017 | Goyal et al. | |
| 9,785,403 B2 | 10/2017 | Goyal et al. | |
| 9,787,693 B2 | 10/2017 | Goyal et al. | |
| 9,823,895 B2 | 11/2017 | Goyal et al. | |
| 9,904,630 B2 | 2/2018 | Goyal et al. | |
| 10,110,558 B2 | 10/2018 | Goyal et al. | |
| 10,339,141 B2 | 7/2019 | Cafarella et al. | |
| 10,511,324 B1 | 12/2019 | Goyal et al. | |
| 10,540,288 B2 | 1/2020 | Noureddine et al. | |
| 2005/0229251 A1 | 10/2005 | Chellapilla et al. | |
| 2006/0069872 A1 | 3/2006 | Bouchard et al. | |
| 2006/0075206 A1 | 4/2006 | Bouchard et al. | |
| 2008/0101371 A1 | 5/2008 | Law et al. | |
| 2009/0138440 A1 | 5/2009 | Goyal | |
| 2010/0114973 A1 | 5/2010 | Goyal | |
| 2011/0016154 A1 | 1/2011 | Goyal et al. | |
| 2011/0107379 A1 | 5/2011 | LaJoie et al. | |
| 2012/0331554 A1 | 12/2012 | Goyal et al. | |
| 2013/0324900 A1 | 12/2013 | Wariar et al. | |
| 2014/0101187 A1 * | 4/2014 | Chao | G06F 16/90344 707/758 |
| 2014/0129775 A1 * | 5/2014 | Ruehle | G06F 12/0868 711/127 |
| 2015/0067123 A1 | 3/2015 | Goyal et al. | |
| 2015/0067776 A1 | 3/2015 | Billa et al. | |
| 2015/0067863 A1 | 3/2015 | Billa et al. | |
| 2015/0295889 A1 | 10/2015 | Goyal et al. | |
| 2015/0295891 A1 | 10/2015 | Goyal et al. | |
| 2018/0287965 A1 | 10/2018 | Sindhu et al. | |
| 2018/0293168 A1 | 10/2018 | Noureddine et al. | |
| 2019/0012278 A1 | 1/2019 | Sindhu et al. | |
| 2019/0012350 A1 | 1/2019 | Sindhu et al. | |
| 2019/0013965 A1 | 1/2019 | Sindhu et al. | |
| 2019/0104206 A1 | 4/2019 | Goel et al. | |
| 2019/0104207 A1 | 4/2019 | Goel et al. | |
| 2019/0158428 A1 | 5/2019 | Gray et al. | |
| 2019/0182114 A1 | 6/2019 | Tavridis et al. | |
| 2019/0312915 A1 | 10/2019 | LaJoie et al. | |
| 2020/0019339 A1 | 1/2020 | Yang et al. | |
| 2020/0019391 A1 | 1/2020 | Yang et al. | |
| 2020/0019404 A1 | 1/2020 | Billa et al. | |
| 2020/0021664 A1 | 1/2020 | Goyal et al. | |

FOREIGN PATENT DOCUMENTS

| | | |
|---|---|---|
| EP | 2215565 A1 | 8/2010 |
| EP | 2276217 A2 | 1/2011 |
| WO | 2003023553 A2 | 3/2003 |
| WO | 2007079095 A2 | 7/2007 |
| WO | 2009070191 A1 | 6/2009 |
| WO | 2009070192 A1 | 6/2009 |
| WO | 2012177736 A1 | 12/2012 |
| WO | 2013078053 A1 | 5/2013 |

OTHER PUBLICATIONS

U.S. Appl. No. 16/035,444, filed Jul. 13, 2018, naming inventors Yang et al.
U.S. Appl. No. 16/035,457, filed Jul. 13, 2018, naming inventors Yang et al.
"Sort Benchmark Home Page," retrieved from http://sortbenchmark.org/ on Feb. 4, 2020, 13 pp.
Notice of Allowance from U.S. Appl. No. 16/035,416, dated Jan. 2, 2020, 9 pp.
International Search Report and Written Opinion of International Application No. PCT/US2019/041246, dated Oct. 31, 2019, 15 pp.
Sidhu et al., "Fast Regular Expression Matching Using FPGAs," Proceedings of the 9th Annual IEEE Symposium on Field-Programmable Custom Computing Machines (FCCM'01), Apr. 29, 2001, pp. 227-238.
Ficara et al., "An Improved FDA for Fast Regular Expression Matching," ACM SIGCOMM Computer Communication Review, vol. 38, No. 5, Oct. 2008, pp. 29-40.
Kumar et al., "Advanced Algorithms for Fast and Scalable Deep Packet Inspection," Proceedings of the 2006 ACM/IEEE Symposium, Dec. 3, 2006, pp. 81-92.
Becchi et al., "Evaluating Regular Expression Matching Engines on Network and General Purpose Processors," Proceedings of the 2009 ACM/IEEE Symposium on Architecture for Networking and Communications Systems, Oct. 19, 2009, pp. 30-39.
Bille et al., "Subsequence Automata with Default Transitions," Journal of Discrete Algorithms, vol. 44, Jun. 13, 2017, pp. 48-55.
Becchi et al., "Efficient Regular Expression Evaluation: Theory to Practice," Proceedings of the 2008 ACM/IEEE Symposium on Architecture for Networking and Communications Systems, Nov. 6, 2008, pp. 50-59.
Zheng et al., "Algorithms to Speedup Pattern Matching for Network Intrusion Detection Systems," Computer Communications, vol. 62, Feb. 2015. pp. 47-58.
Gogte et al., "HARE: Hardware Accelerator for Regular Expressions," 49th Annual IEEE/ACM International Symposium on Microarchitecture (MICRO), Oct. 2016, 12 pp.
Van Lunteren et al., "Designing a Programmable Wire-Speed Regular-Expression Matching Accelerator," 2012 IEEE/ACM 45th Annual International Symposium on Microarchitecture, Dec. 1-5, 2012, pp. 461-472.
Qi et al., "FEACAN: Front-End Acceleration for Content-Aware Network Processing," 2011 Proceedings IEEE INFOCOM, Apr. 10-15, 2011, pp. 2114-2122.
Notice of Allowance from U.S. Appl. No. 16/035,444, dated Sep. 25, 2019, 9 pp.
U.S. Appl. No. 16/144,689, filed Jun. 13, 2019, by Nayakam et al.
U.S. Appl. No. 16/157,265, filed Oct. 11, 2018, by Thomas et al.
U.S. Appl. No. 16/169,736, filed Oct. 24, 2018, by Goyal et al.
U.S. Appl. No. 16/178,373, filed Nov. 1, 2018, by Billa et al.
U.S. Appl. No. 16/179,472, filed Nov. 2, 2018, by Dikshit et al.
U.S. Appl. No. 16/179,496, filed Nov. 2, 2018, by Dikshit et al.
U.S. Appl. No. 16/179,529, filed Nov. 2, 2018, by Dikshit et al.
U.S. Appl. No. 16/179,558, filed Nov. 2, 2018, by Dikshit et al.
U.S. Appl. No. 16/195,209, filed Nov. 19, 2018, by Beckman et al.
U.S. Appl. No. 16/195,290, filed Nov. 19, 2018, by Beckman et al.
U.S. Appl. No. 16/195,564, filed Nov. 19, 2018, by Beckman et al.
U.S. Appl. No. 16/195,617, filed Nov. 19, 2018, by Beckman et al.
U.S. Appl. No. 16/195,644, filed Nov. 19, 2018, by Beckman et al.
U.S. Appl. No. 16/198,607, filed Nov. 21, 2018, by Goyal et al.
U.S. Appl. No. 16/200,484, filed Nov. 26, 2018, by Billa et al.
U.S. Appl. No. 16/249,658, filed Jan. 16, 2019, by Thomas et al.
U.S. Appl. No. 16/265,606, filed Feb. 1, 2019, by Goyal et al.
U.S. Appl. No. 16/584,293, filed Sep. 26, 2019, by Goyal et al.
U.S. Appl. No. 16/584,390, filed Sep. 26, 2019, by Billa et al.
U.S. Appl. No. 16/584,467, filed Sep. 26, 2019, by Billa et al.
Notice of Allowance from U.S. Appl. No. 16/035,444, dated Jan. 29, 2020, 7 pp.

* cited by examiner

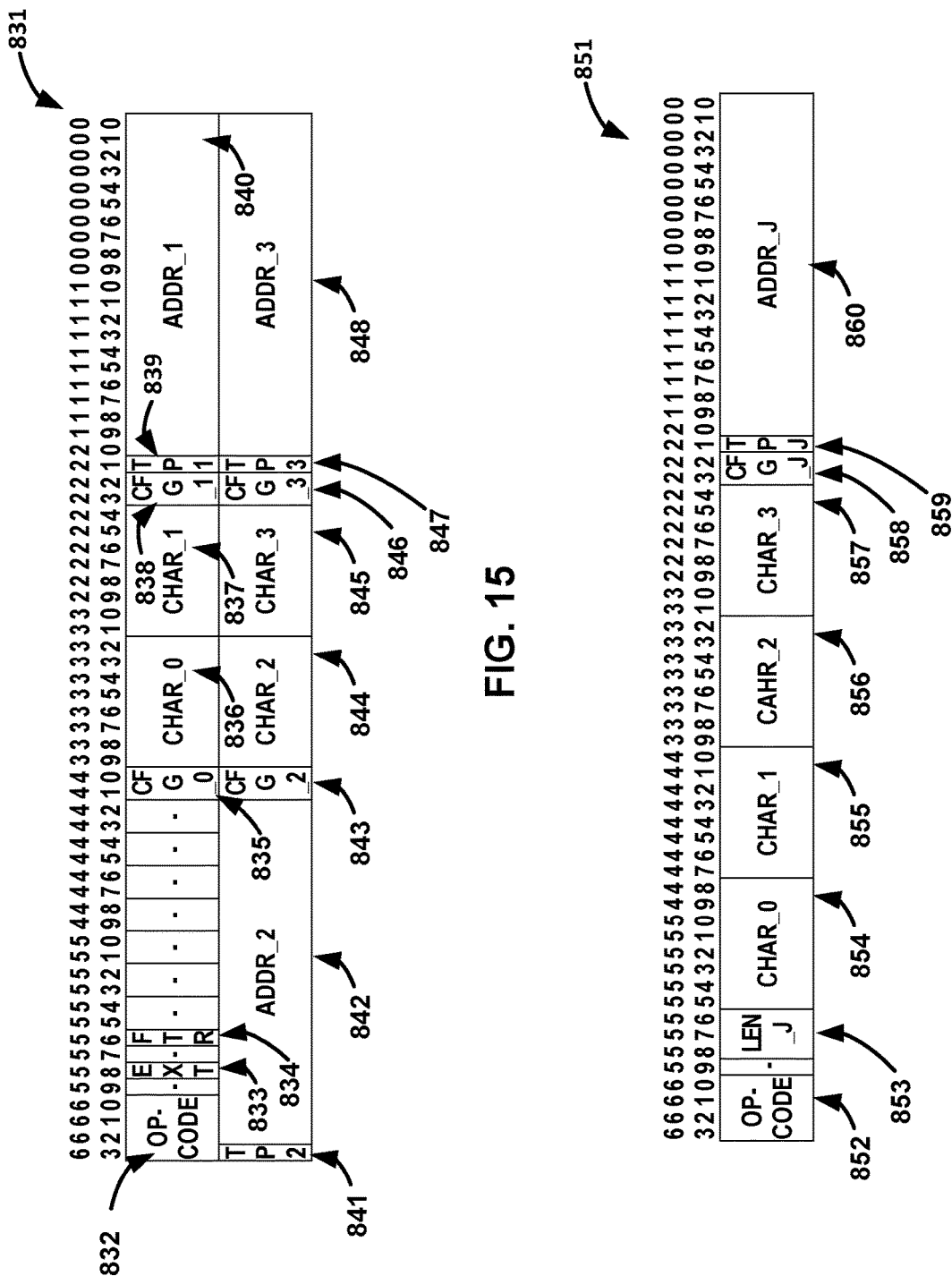

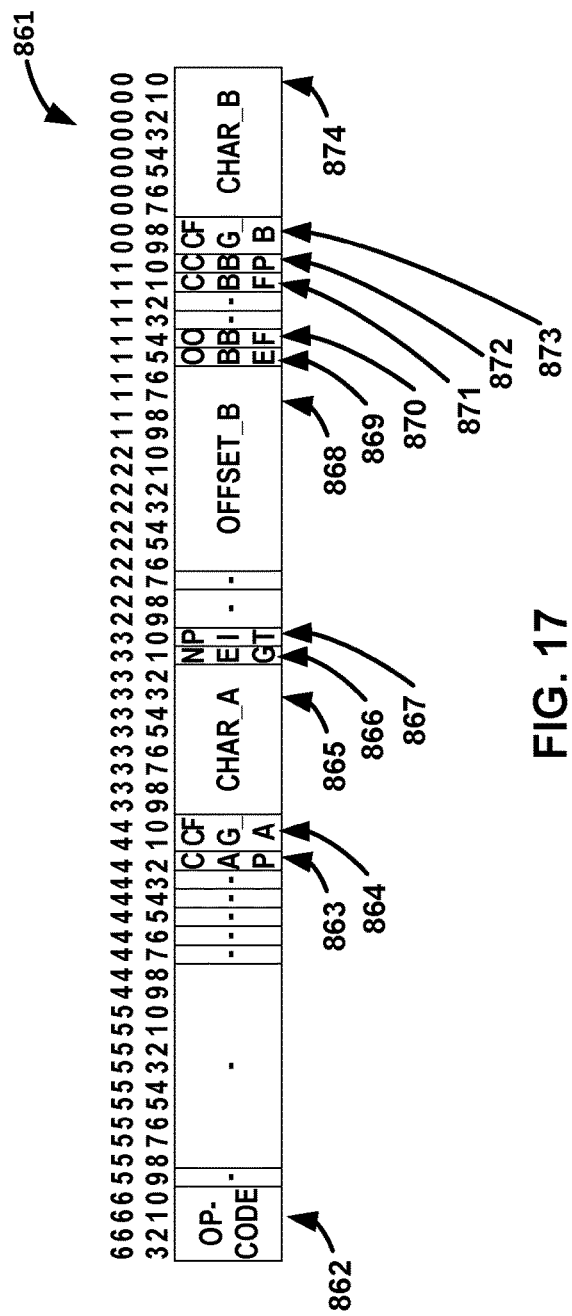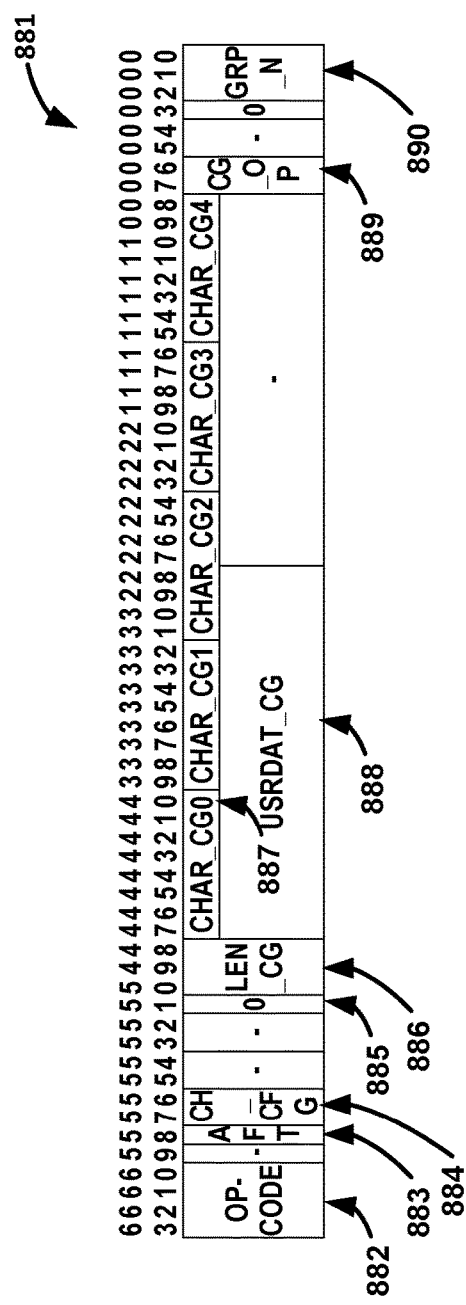

INSTRUCTION-BASED NON-DETERMINISTIC FINITE STATE AUTOMATA ACCELERATOR

TECHNICAL FIELD

The disclosure relates to processing packets of information, for example, in the fields of networking and storage.

BACKGROUND

In a typical computer network, a large collection of interconnected servers provides computing and/or storage capacity for execution of various applications. A data center is one example of a large-scale computer network and typically hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy.

Many devices within a computer network, e.g., storage/compute servers, firewalls, intrusion detection devices, switches, routers or other network attached devices, often use general purpose processors, including multi-core processing systems, to process data, such as network or storage data. However, general purpose processing cores and multi-processing systems are normally not designed for high-capacity network and storage workloads of modern networks and can be relatively poor at performing packet stream processing.

SUMMARY

In general, this disclosure describes a highly programmable device, referred to generally as a data processing unit, having multiple processing units for processing streams of information, such as network packets or storage packets. In some examples, the processing units may be processing cores, and in other examples, the processing units may be virtual processors, hardware threads, hardware blocks, or other sub-processing core units. As described herein, the data processing unit includes one or more specialized hardware-based accelerators configured to perform acceleration for various data-processing functions, thereby offloading tasks from the processing units.

In various examples, this disclosure describes a programmable, hardware-based accelerator unit configured to apply and evaluate regular expressions against high-speed data streams. The accelerator unit may include a hardware implementation of a regular expression (RegEx) evaluation engine, and thus, may be referred to herein as a RegEx accelerator unit, or simply a RegEx accelerator. In particular, the RegEx accelerator unit may be configured to compile a regular expression into a non-deterministic finite automata (NFA) graph including one or more instructions, such that the one or more instructions may be used to evaluate the corresponding regular expression against particular data units of the data streams. Regular expressions generally define a pattern of characters, expressed in a regular language, to be identified in an input sequence of characters, such as one or more payloads of one or more packets. The RegEx accelerator of this disclosure may be configured to identify occurrences of one or more target strings defined by one or more respective regular expressions in a set of one or more payloads of packets using instructions of one or more NFA graphs. The RegEx accelerator may be used as part of various data processing services, such as intrusion detection and prevention (IDP), anti-virus scanning, search, indexing, and the like.

In one example, a processing device includes a memory including a NFA buffer configured to store a plurality of instructions defining an ordered sequence of instructions of at least a portion of an NFA graph, the portion of the NFA graph comprising a plurality of nodes arranged along a plurality of paths. The processing device further includes an NFA engine implemented in circuitry, the NFA engine comprising one or more NFA threads implemented in circuitry. Each of the NFA threads comprises a program counter storing a value defining a next instruction of the plurality of instructions and a payload offset memory storing a value defining a position of a current symbol in an ordered sequence of symbols of a payload segment of payload data. The NFA engine further comprises a processing unit configured to determine the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions and in response to determining the current symbol and the one or more subsequent symbols of the payload segment that satisfy the match condition, output an indication that the payload data has resulted in a match.

In another example, a method comprises storing, by a NFA engine of a processing device, the NFA engine implemented in circuitry, a plurality of instructions defining an ordered sequence of instructions of at least a portion of an NFA graph, the portion of the NFA graph comprising a plurality of nodes arranged along a plurality of paths. The method further comprises determining, by an NFA thread of the NFA engine, the NFA thread implemented in circuitry, a value defining a next instruction of the plurality of instructions and determining, by the NFA thread, a value defining a position of a current symbol in an ordered sequence of symbols of a payload segment of payload data. The method further comprises determining, by the NFA thread, the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions and in response to determining the current symbol and the one or more subsequent symbols of the payload segment that satisfy the match condition, outputting an indication that the payload data has resulted in a match.

The details of one or more examples are set forth in the accompanying drawings and the description below. Other features, objects, and advantages will be apparent from the description and drawings, and from the claims.

BRIEF DESCRIPTION OF DRAWINGS

FIG. 15 is a conceptual diagram illustrating an example fork instruction according to the techniques of this disclosure.

FIG. 16 is a conceptual diagram illustrating an example join instruction according to the techniques of this disclosure.

FIG. 17 is a conceptual diagram illustrating an example assert instruction according to the techniques of this disclosure.

FIG. 18 is a conceptual diagram illustrating an example capture group instruction according to the techniques of this disclosure.

DETAILED DESCRIPTION

Figure 1:
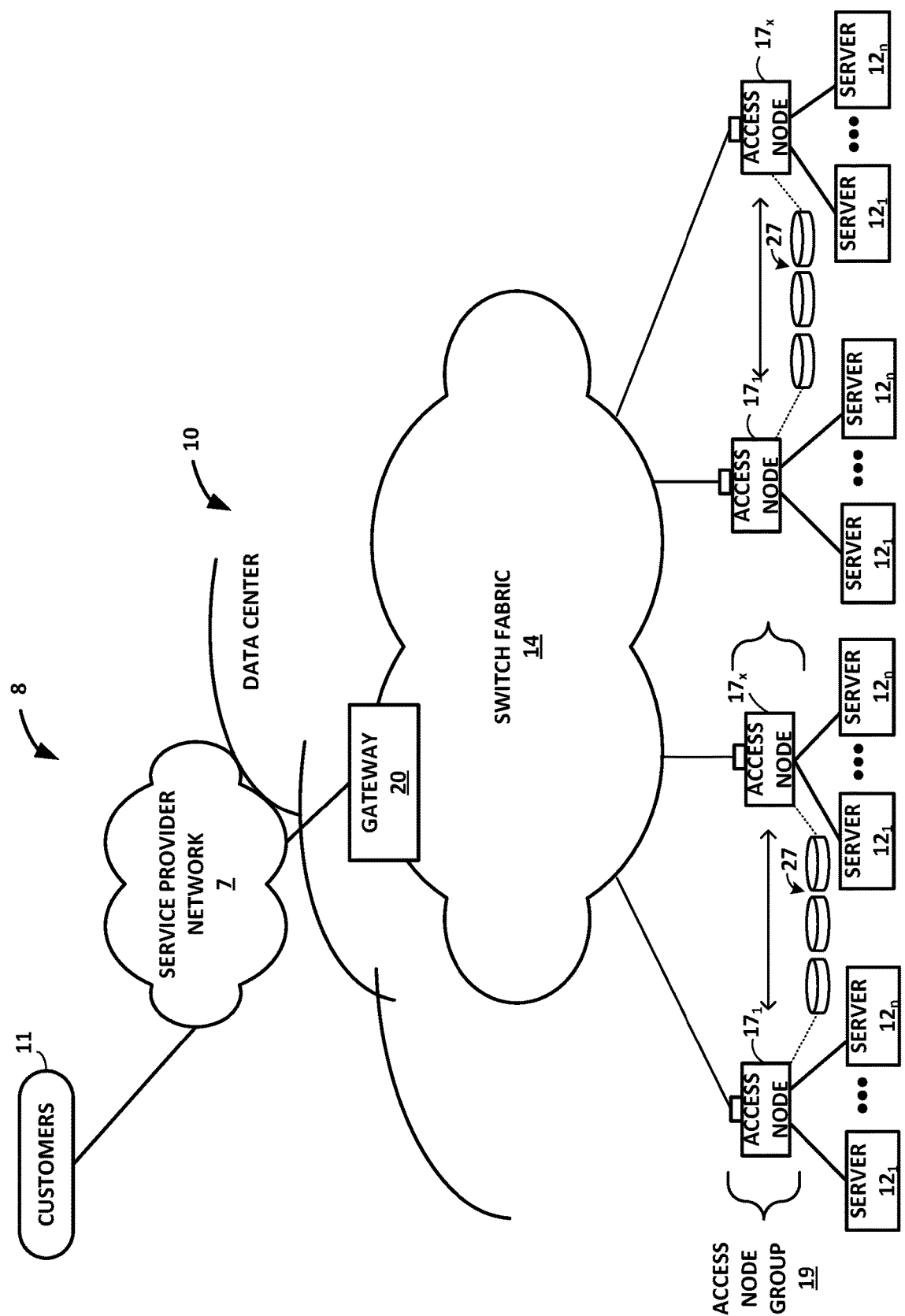
FIG. 1 is a block diagram illustrating an example system including one or more network devices configured to efficiently process a series of work units in a multiple core processor system.

FIG. 1 is a block diagram illustrating an example system 8 including one or more network devices configured to efficiently process a series of work units in a multiple core processor system. As described herein, techniques for "macro-instructions" of at least a portion of a non-deterministic finite automata (NFA) graph may provide technical benefits that include improving the efficiency and utilization of processing cores within access nodes 17 in FIG. 1. Access nodes may also be referred to as data processing units (DPUs), or devices including DPUs, in this disclosure. In the example of FIG. 1, various data structures and processing techniques are described with respect to access nodes 17 within a data center 10. Other devices within a network, such as routers, switches, servers, firewalls, gateways and the like, having multiple core processor systems may readily be configured to utilize the data processing techniques described herein.

Data center 10 represents an example of a system in which various techniques described herein may be implemented. In general, data center 10 provides an operating environment for applications and services for customers 11 coupled to the data center by service provider network 7 and gateway device 20. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet. In other examples, service provider network 7 may be a data center wide-area network (DC WAN), private network or other type of network.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the illustrated example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, each of servers 12 is coupled to switch fabric 14 by an access node 17 for processing streams of information, such as network packets or storage packets. In example implementations, access nodes 17 may be configurable to operate in a standalone network appliance having one or more access nodes. For example, access nodes 17 may be arranged into multiple different access node groups 19, each including any number of access nodes up to, for example, x access nodes $17_1$-$17_x$. In other examples, each access node may be implemented as a component (e.g., electronic chip) within a device, such as a compute node, application server, storage server, and may be deployed on a motherboard of the device or within a removable card, such as a storage and/or network interface card.

In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as solid state drives (SSDs) and/or hard disk drives (HDDs), configured to provide network accessible storage for use by applications executing on the servers 12. In some examples, one or more of the SSDs may comprise non-volatile memory (NVM) or flash memory. Each access node group 19, including its set of access nodes 17 and storage devices 27, and the set of servers 12 supported by the access nodes 17 of that access node group 19 may be referred to herein as a network storage compute unit.

As further described herein, in one example, each access node 17 is a highly programmable I/O processor (referred to as a DPU) specially designed for offloading certain functions from servers 12. In one example, each access node 17 includes a number of internal processor clusters, each including two or more processing cores and equipped with hardware engines that offload cryptographic, compression and decompression, regular expression (RegEx) processing, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers. Additional example details of various example DPUs are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of both being incorporated herein by reference. In accordance with the techniques of this disclosure, any or all of access nodes 17 may include a regular expression (RegEx) accelerator unit. That is, one or more computing devices may include an access node including one or more RegEx accelerator units, according to the techniques of this disclosure.

The RegEx accelerator unit of the access node, according to the techniques of this disclosure, may be configured to process payloads of packets during various services as the packets are exchanged by access nodes 22, e.g., between access nodes 22 via switch fabric 14 and/or between servers 12. That is, as packets are exchanged between the devices, either for networking or data storage and retrieval, the access node may perform an evaluation service on payloads of the packet. For example, the access node may provide evaluation services in the form of intrusion detection, intrusion prevention, intrusion detection and prevention (IDP), anti-virus scanning, search, indexing, or the like. The access node may use one or more RegEx accelerator units to identify target input data (such as target input strings), such as virus definitions, attempted intrusions, search strings, indexing strings, or the like. The target input data may be defined according to respective regular expressions. According to the techniques of this disclosure, each of the RegEx accelerator units may include a hardware implementation of a regular expression evaluator, which may compile a regular expression into one or more instructions of one or more NFA graphs, such that the one or more instructions may be used to evaluate the corresponding regular expression against particular data units of the data streams.

In the example of FIG. 1, each access node 17 provides connectivity to switch fabric 14 for a different group of servers 12 and may be assigned respective IP addresses and provide routing operations for the servers 12 coupled thereto. Access nodes 17 may interface with and utilize switch fabric 14 so as to provide full mesh (any-to-any) interconnectivity such that any of servers 12 may communicate packet data for a given packet flow to any other of the servers using any of a number of parallel data paths within the data center 10. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. More details on the example data center network architecture and interconnected access nodes illustrated in FIG. 1 are available in U.S. patent application Ser. No. 15/939,227, filed Mar. 28, 2018, entitled "Non-Blocking Any-to-Any Data Center Network with Packet Spraying Over Multiple Alternate Data Paths," the entire content of which is incorporated herein by reference.

Various example architectures of access nodes 17 are described below with respect to FIGS. 2, 3, 4A, and 4B. With respect to either example, the architecture of each access node 17 comprises a multiple core processor system that represents a high performance, hyper-converged network, storage, and data processor and input/output hub. The architecture of each access node 17 is optimized for high performance and high efficiency stream processing.

In general, a stream, also referred to as a data stream, may be viewed as an ordered, unidirectional sequence of computational objects that can be of unbounded or undetermined length. In a simple example, a stream originates in a producer and terminates at a consumer, is operated on sequentially, and is flow-controlled. In some examples, a stream can be defined as a sequence of stream fragments, each representing a portion of data communicated by a stream. In one example, a stream fragment may include a memory block contiguously addressable in physical address space, an offset into that block, and a valid length. Streams can be discrete, such as a sequence of packets received from a network, or continuous, such as a stream of blocks, words, or bytes read from a storage device. A stream of one type may be transformed into another type as a result of processing. Independent of the stream type, stream manipulation requires efficient fragment manipulation. An application executing on one of access nodes 17 may operate on a stream in three broad ways: the first is protocol processing, which consists of operating on control information or headers within the stream; the second is payload processing, which involves significant accessing of the data within the stream; and third is some combination of both control and data access.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within one of access nodes 17 can safely access different windows within the stream.

As described herein, data processing units of access nodes 17 may process stream information by managing "work units." In general, a Work Unit (WU) is a container that is associated with a stream state and used to describe (i.e. point to) data within a stream (stored in memory) along with any associated meta-data and operations to be performed on the data. In the example of FIG. 1, streams of data units may dynamically originate within a peripheral unit of one of access nodes 17 (e.g. injected by a networking unit, a host unit, or a solid state drive interface), or within a processor of the one of access nodes 17, in association with one or more streams of data, and terminate at another peripheral unit or another processor of the one of access nodes 17. Each work unit maintained by a data processing unit is associated with an amount of work that is relevant to the entity executing the work unit for processing a respective portion of a stream.

Stream processing is typically initiated as a result of receiving one or more data units associated with respective portions of the stream and constructing and managing work units for processing respective portions of the data stream. In protocol processing, a portion would be a single buffer (e.g. packet), for example. Within access nodes 17, work units may be executed by processor cores, hardware blocks, I/O interfaces, or other computational processing units. For instance, a processor core of an access node 17 executes a work unit by accessing the respective portion of the stream from memory and performing one or more computations in accordance with the work unit. A component of the one of access nodes 17 may receive, execute or generate work units. A succession of work units may define how the access node processes a flow, and smaller flows may be stitched together to form larger flows.

For purposes of example, DPUs within each access node 17 may execute an operating system, such as a general-purpose operating system (e.g., Linux or other flavor of Unix) or a special-purpose operating system, that provides an execution environment for data plane software for data processing. Moreover, each DPU may be configured to utilize a work unit (WU) stack data structure (referred to as a 'WU stack' in a multiple core processor system. As described herein, the WU stack data structure may provide certain technical benefits, such as helping manage an event driven, run-to-completion programming model of an operating system executed by the multiple core processor system. The WU stack, in a basic form, may be viewed as a stack of continuation WUs used in addition to (not instead of) a program stack maintained by the operating system as an efficient means of enabling program execution to dynamically move between cores of the access node while performing high-rate stream processing. As described below, a WU data structure is a building block in the WU stack and can readily be used to compose a processing pipeline and services execution in a multiple core processor system. The WU stack structure carries state, memory, and other information in auxiliary variables external to the program stack for any given processor core. In some implementations, the WU stack may also provide an exception model for handling abnormal events and a 'success bypass' to shortcut a long series of operations. Further, the WU stack may be used as an arbitrary flow execution model for any combination of pipelined or parallel processing.

As described herein, access nodes 17 may process WUs through a plurality of processor cores arranged as processing pipelines within access nodes 17, and such processing cores may employ techniques to encourage efficient processing of such work units and high utilization of processing resources. For instance, a processing core (or a processing unit within a core) may, in connection with processing a series of work units, access data and cache the data into a plurality of segments of a level 1 cache associated with the processing core. In some examples, a processing core may process a work unit and cache data from non-coherent memory in a segment of the level 1 cache. The processing core may also concurrently prefetch data associated with a work unit expected to be processed in the future into another segment of the level 1 cache associated with the processing core. By prefetching the data associated with the future work unit in advance of the work unit being dequeued from a work unit queue for execution by the core, the processing core may be able to efficiently and quickly process a work unit once the work unit is dequeued and execution of the work unit is to commence by the processing core. More details on work units and stream processing by data processing units of access nodes are available in U.S. Provisional Patent Application No. 62/589,427, filed Nov. 21, 2017, entitled "Work Unit Stack Data Structures in Multiple Core Processor System," and U.S. Provisional Patent Application No. 62/625,518, entitled "EFFICIENT WORK UNIT PROCESSING IN A MULTICORE SYSTEM", filed Feb. 2, 2018, the entire contents of both being incorporated herein by reference.

As described herein, the data processing units for access nodes 17 includes one or more specialized hardware-based accelerators configured to perform acceleration for various data-processing functions, thereby offloading tasks from the processing units when processing work units. That is, each accelerator is programmable by the processing cores, and one or more accelerators may be logically chained together to operate on stream data units, such as by providing cryptographic functions, compression and regular expression (RegEx) processing, data storage functions and networking operations. This disclosure describes a programmable, hardware-based accelerator unit configured to apply and evaluate regular expressions against high-speed data streams. The accelerator unit may include a hardware implementation of a regular expression (RegEx) evaluator, and thus, may be referred to herein as a RegEx accelerator unit, or simply a RegEx accelerator. In particular, the RegEx accelerator unit may be configured to construct one or more instructions of a NFA to evaluate regular expressions against particular data units of the data streams.

Figure 2:
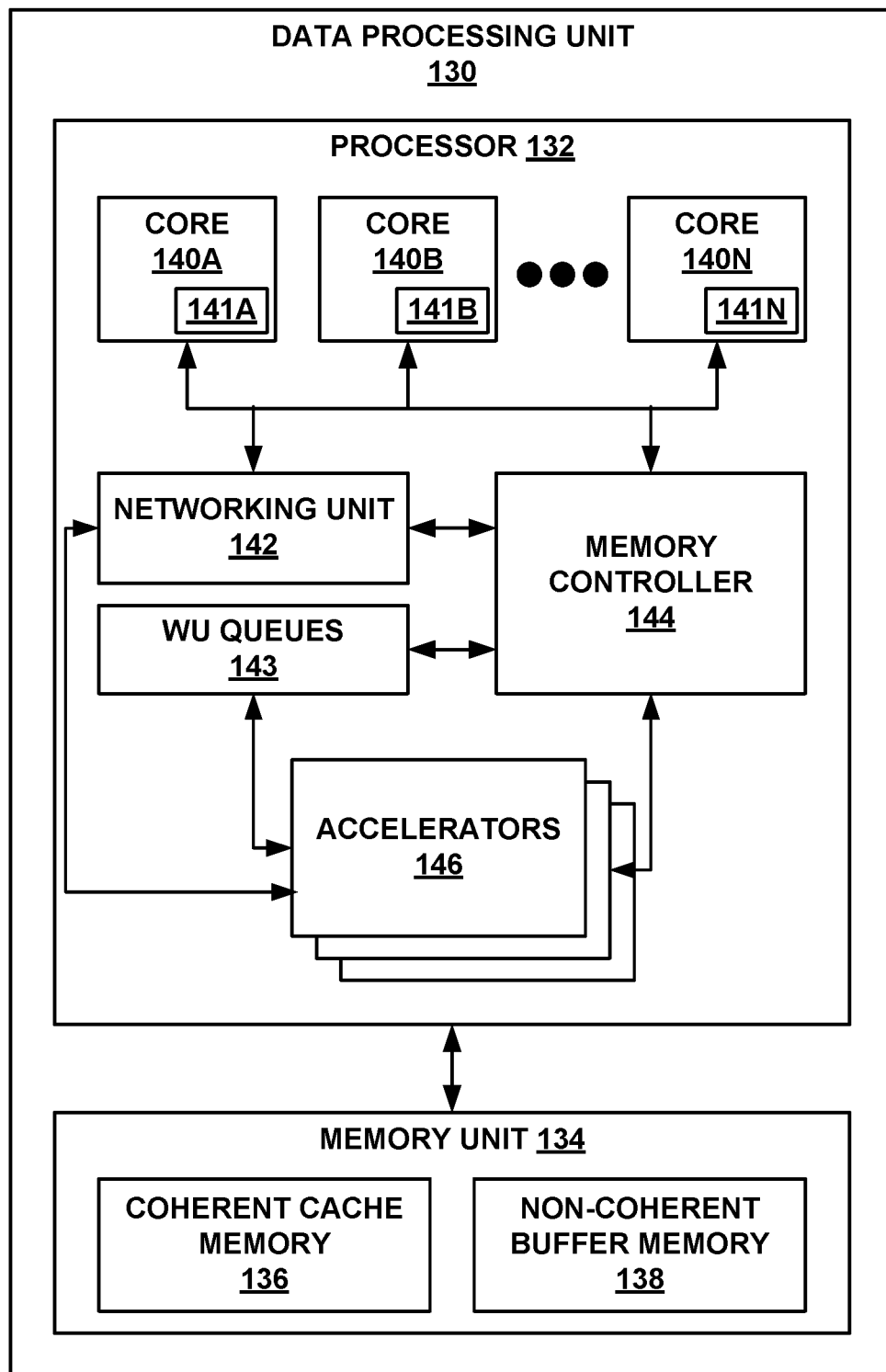
FIG. 2 is a block diagram illustrating an example data processing unit (DPU) including two or more processing cores, in accordance with the techniques of this disclosure.

FIG. 2 is a block diagram illustrating an example data processing unit (DPU) 130 including two or more processing cores, in accordance with the techniques of this disclosure. DPU 130 generally represents a hardware chip implemented in digital logic circuitry and may be used in any computing or network device. DPU 130 may operate substantially similar to and generally represent any of access nodes 17 of FIG. 1. Thus, DPU 130 may be communicatively coupled to one or more network devices, server devices (e.g., servers 12), random access memory, storage media (e.g., solid state drives (SSDs)), a data center fabric (e.g., switch fabric 14), or the like, e.g., via PCI-e, Ethernet (wired or wireless), or other such communication media. Moreover, DPU 130 may be implemented as one or more application-specific integrated circuit (ASIC), may be configurable to operate as a component of a network appliance or may be integrated with other DPUs within a device.

In the illustrated example of FIG. 2, DPU 130 includes a multi-core processor 132 having a plurality of programmable processing cores 140A-140N ("cores 140") coupled to an on-chip memory unit 134. Each of cores 140 includes a level 1 cache 141 (level 1 caches 141a, 141b, and 141n are associated with cores 140a, 140b, and 140n, respectively).

Memory unit 134 may include two types of memory or memory devices, namely coherent cache memory 136 and non-coherent buffer memory 138. Processor 132 also includes a networking unit 142, work unit (WU) queues 143, a memory controller 144, and accelerators 146. As illustrated in FIG. 2, each of cores 140, networking unit 142, WU queues 143, memory controller 144, memory unit 134, and accelerators 146 are communicatively coupled to each other. Processor 132 of DPU 130 further includes one or more accelerators 146 configured to perform acceleration for various data-processing functions, such as look-ups, matrix multiplication, cryptography, compression, regular expressions, or the like.

In this example, DPU 130 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1. DPU 130 may also include one or more interfaces for connectivity to host devices (e.g., servers) and data storage devices, e.g., solid state drives (SSDs) via PCIe lanes. DPU 130 may further include one or more high bandwidth interfaces for connectivity to off-chip external memory.

Processor 132 further includes accelerators 146 configured to perform acceleration for various data-processing functions, such as look-ups, matrix multiplication, cryptography, compression, regular expressions, or the like. For example, accelerators 146 may comprise hardware implementations of look-up engines, matrix multipliers, cryptographic engines, compression engines, or the like. The functionality of different hardware accelerators is described is more detail below with respect to FIG. 4. In accordance with the techniques of this disclosure, at least one of accelerators 146 represents a hardware implementation of a regular expression engine. In particular, according to the techniques of this disclosure, accelerators 146 include at least one RegEx accelerator that includes one or more NFA engines configured to execute instructions of an NFA graph that are compiled using regular expressions, as discussed in greater detail below.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. More details on the bifurcated memory system included in the DPU are available in U.S. Provisional Patent Application No. 62/483,844, filed Apr. 10, 2017, and titled "Relay Consistent Memory Management in a Multiple Processor System," the entire content of which is incorporated herein by reference.

Cores 140 may comprise one or more microprocessors without interlocked pipeline stages (MIPS) cores, reduced instruction set computing (RISC) cores, advanced RISC machine (ARM) cores, performance optimization with enhanced RISC—performance computing (PowerPC) cores, RISC Five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

Each of level 1 caches 141 may include a plurality of cache lines logically or physically divided into cache segments. Each of level 1 caches 141 may be controlled by a load/store unit also included within the core. The load/store unit may include logic for loading data into cache segments and/or cache lines from non-coherent buffer memory 138 and/or memory external to DPU 130.

As described herein, processor cores 140 may be arranged as processing pipelines, and such processing cores may employ techniques to encourage efficient processing of such work units and high utilization of processing resources. For instance, any of processing cores 140 (or a processing unit within a core) may, in connection with processing a series of work units retrieved from WU queues 143, access data and cache the data into a plurality of segments of level 1 cache 141 associated with the processing core. In some examples, a processing core 140 may process a work unit and cache data from non-coherent buffer memory 138 in a segment of the level 1 cache 141.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

As another example use case, transfer of ownership of a memory buffer between processing cores may be mediated by a work unit message delivered to one or more of processing cores 140. For example, the work unit message may be a four-word message including a pointer to a memory buffer. The first word may be a header containing information necessary for message delivery and information used for work unit execution, such as a pointer to a function for execution by a specified one of processing cores 140. Other words in the work unit message may contain parameters to be passed to the function call, such as pointers to data in memory, parameter values, or other information used in executing the work unit.

In one example, receiving a work unit is signaled by receiving a message in a work unit receive queue (e.g., one of WU queues 143). The one of WU queues 143 is associated with a processing element, such as one of cores 140, and is addressable in the header of the work unit message. One of cores 140 may generate a work unit message by executing stored instructions to addresses mapped to a work unit transmit queue (e.g., another one of WU queues 143). The stored instructions write the contents of the message to the queue. The release of a work unit message may be interlocked with (gated by) flushing of the core's dirty cache data and in some examples, prefetching into the cache of data associated with another work unit for future processing.

Figure 3:
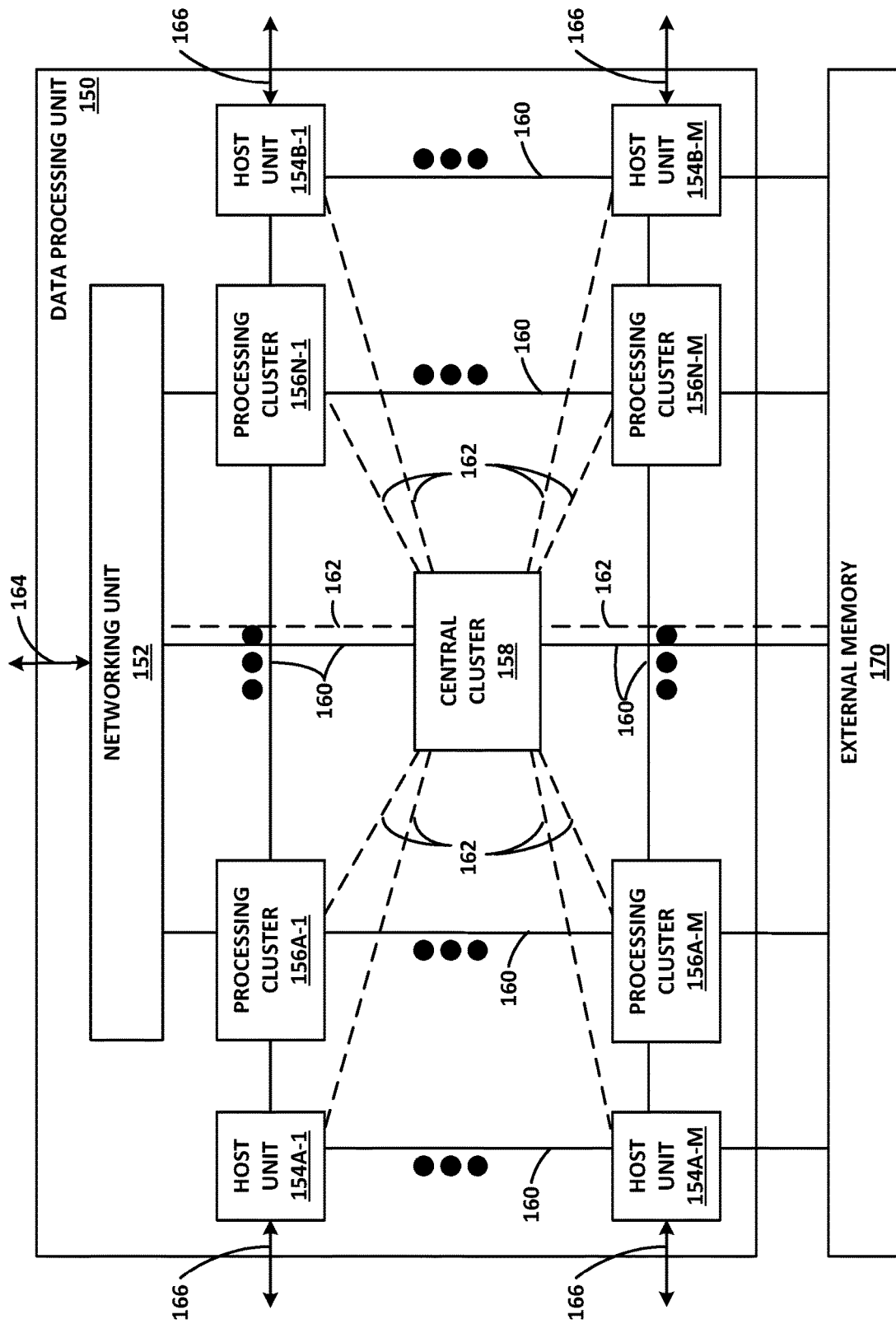
FIG. 3 is a block diagram illustrating another example data processing unit including two or more processing clusters, in accordance with the techniques of this disclosure.

FIG. 3 is a block diagram illustrating one example of a DPU 150 including a networking unit, at least one host unit, and two or more processing clusters. DPU 150 may operate substantially similar to any of the access nodes 17 of FIG. 1. Thus, DPU 150 may be communicatively coupled to a data center fabric (e.g., switch fabric 14), one or more server devices (e.g., servers 12), storage media (e.g., SSDs), one or more network devices, random access memory, or the like, e.g., via PCI-e, Ethernet (wired or wireless), or other such communication media in order to interconnect each of these various elements. DPU 150 generally represents a hardware chip implemented in digital logic circuitry. As various examples, DPU 150 may be provided as an integrated circuit mounted on a motherboard of a computing, networking and/or storage device or installed on a card connected to the motherboard of the device.

In general, DPU 150 represents a high performance, hyper-converged network, storage, and data processor and input/output hub. As illustrated in FIG. 3, DPU 150 includes networking unit 152, processing clusters 156A-1 to 156N-M (processing clusters 156), host units 154A-1 to 154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random access memory (DRAM).

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of DPU 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 each have PCI-e interfaces 166 to connect to servers and/or storage devices, such as SSD devices. This allows DPU 150 to operate as an endpoint or as a root. For example, DPU 150 may connect to a host system (e.g., a server) as an endpoint device, and DPU 150 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

DPU 150 provides optimizations for stream processing. DPU 150 executes an operating system that facilitates run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In one example, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

DPU 150 operates on work units (WUs) that associate a buffer with an instruction stream to reduce dispatching overhead and allow processing by reference to minimize data movement and copy. The stream-processing model may structure access by multiple processors (e.g., processing clusters 156) to the same data and resources, avoid simultaneous sharing, and therefore, reduce contention. A processor may relinquish control of data referenced by a work unit as the work unit is passed to the next processor in line. Central cluster 158 may include a central dispatch unit responsible for work unit queuing and flow control, work unit and completion notification dispatch, and load balancing and processor selection from among processing cores of processing clusters 156 and/or central cluster 158.

As described above, work units are sets of data exchanged between processing clusters 156, networking unit 152, host units 154, central cluster 158, and external memory 170. Each work unit may be represented by a fixed length data structure, or message, including an action value and one or more arguments. In one example, a work unit message includes four words, a first word having a value representing an action value and three additional words each representing an argument. The action value may be considered a work unit message header containing information necessary for message delivery and information used for work unit execution, such as a work unit handler identifier, and source and destination identifiers of the work unit. The other arguments of the work unit data structure may include a frame argument having a value acting as a pointer to a continuation work unit to invoke a subsequent work unit handler, a flow argument having a value acting as a pointer to state that is relevant to the work unit handler, and a packet argument having a value acting as a packet pointer for packet and/or block processing handlers.

In some examples, one or more processing cores of processing clusters 180 may be configured to execute program instructions using a work unit (WU) stack. In general, a work unit (WU) stack is a data structure to help manage event driven, run-to-completion programming model of an operating system typically executed by processing clusters 156 of DPU 150, as further described in U.S. Patent Application Ser. No. 62/589,427, filed Nov. 21, 2017, the entire content of which is incorporated herein by reference.

As described herein, in some example implementations, load store units within processing clusters 156 may, concurrent with execution of work units by cores within the processing clusters, identify work units that are enqueued in WU queues for future processing by the cores. In some examples, WU queues storing work units enqueued for processing by the cores within processing clusters 156 may be maintained as hardware queues centrally managed by central cluster 158. In such examples, load store units may interact with central cluster 158 to identify future work units to be executed by the cores within the processing clusters. The load store units prefetch, from the non-coherent memory portion of external memory 170, data associated with the future work units. For each core within processing clusters 156, the load store units of the core may store the prefetched data associated with the WU to be processed by the core into a standby segment of the level 1 cache associated with the processing core.

Figure 4:
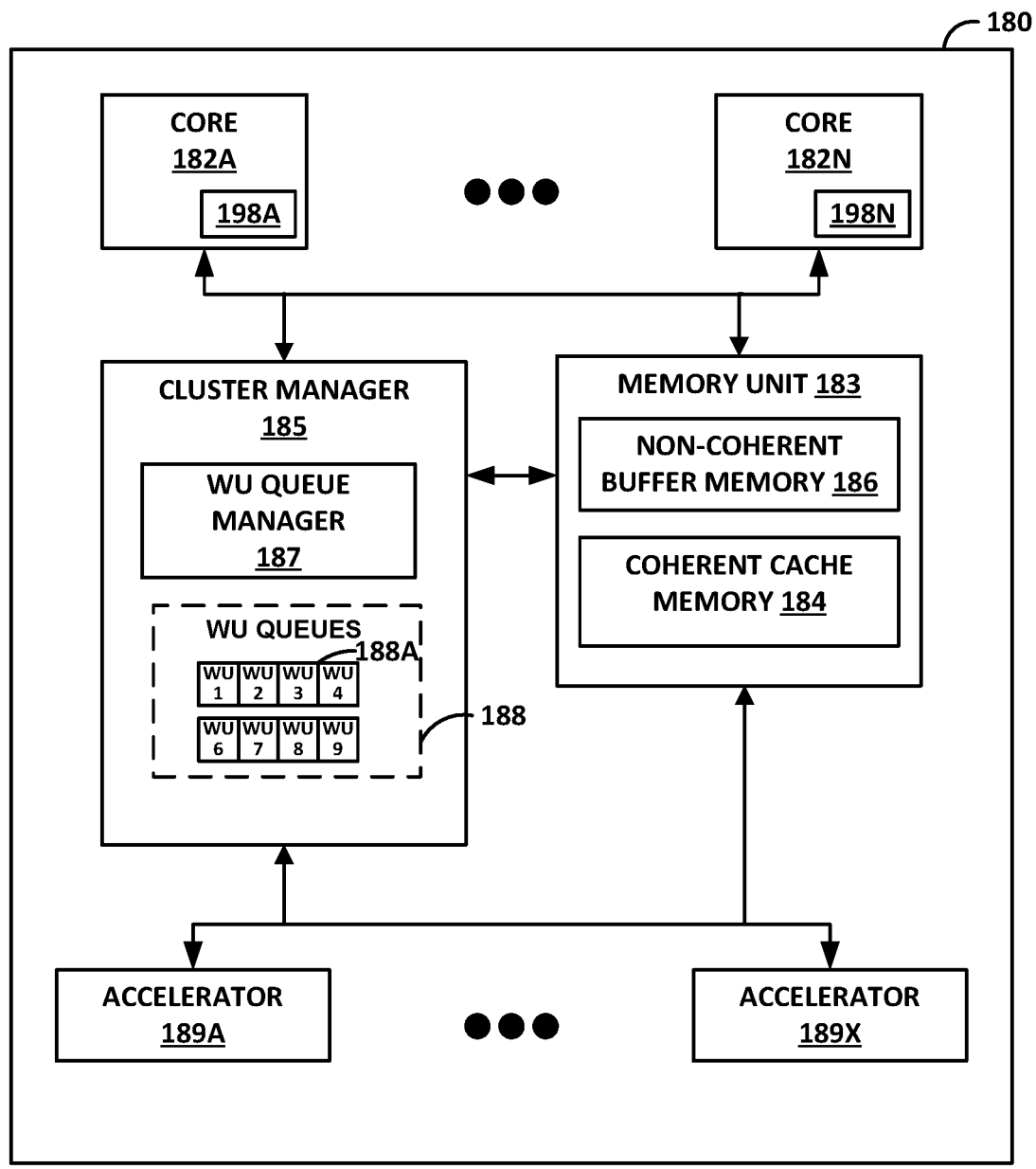
FIG. 4 is a block diagram illustrating an example processing cluster including a plurality of programmable processing cores.

FIG. 4 is a block diagram illustrating another example processing cluster 180 including a plurality of programmable processing cores 182A-182N. Each of processing clusters 156 of DPU 150 of FIG. 3 may be configured in a manner substantially similar to that shown in FIG. 4. In the example of FIG. 4, processing cluster 180 includes cores 182A-182N ("cores 182"), a memory unit 183 including a coherent cache memory 184 and a non-coherent buffer memory 186, a cluster manager 185 including WU queue manager 187 for maintaining (e.g., within hardware registers of processing cluster 180) and manipulating WU queues 188, and accelerators 189A-189X ("accelerators 189"). Each of cores 182 includes L1 buffer cache 198 (i.e., core 182 includes L1 buffer cache 198A and in general, core 182N includes L1 buffer cache 198N). In some examples, cluster manager 185 is alternatively located within central cluster 158, and/or WU queues 188 are alternatively maintained within central cluster 158 (e.g., within hardware registers of central cluster 158).

An access node or DPU (such as access nodes 17 of FIG. 1, DPU 130 of FIG. 2, or DPU 150 of FIG. 3) may support two distinct memory systems: a coherent memory system and a non-coherent buffer memory system. In the example of FIG. 4, coherent cache memory 184 represents part of the coherent memory system while non-coherent buffer memory 186 represents part of the non-coherent buffer memory system. Cores 182 may represent the processing cores discussed with respect to DPU 150 of FIG. 3. Cores 182 may share non-coherent buffer memory 186. As one example, cores 182 may use non-coherent buffer memory 186 for sharing streaming data, such as network packets.

In general, accelerators 189 perform acceleration for various data-processing functions, such as table lookups, matrix multiplication, cryptography, compression, regular expressions, or the like. That is, accelerators 189 may comprise hardware implementations of lookup engines, matrix multipliers, cryptographic engines, compression engines, regular expression interpreters, or the like. For example, accelerators 189 may include a lookup engine that performs hash table lookups in hardware to provide a high lookup rate. The lookup engine may be invoked through work units from external interfaces and virtual processors of cores 182, and generates lookup notifications through work units. Accelerators 189 may also include one or more cryptographic units to support various cryptographic processes. Accelerators 189 may also include one or more compression units to perform compression and/or decompression.

An example process by which a processing cluster 180 processes a work unit is described here. Initially, cluster manager 185 of processing cluster 180 may queue a work unit (WU) in a hardware queue of WU queues 188. When cluster manager 185 "pops" the work unit from the hardware queue of WU queues 188, cluster manager 185 delivers the work unit to one of accelerators 189, e.g., a lookup engine. The accelerator 189 to which the work unit is delivered processes the work unit and determines that the work unit is to be delivered to one of cores 182 (in particular, core 182A, in this example) of processing cluster 180. Thus, the one of accelerators 189 forwards the work unit to a local switch of the signaling network on the DPU, which forwards the work unit to be queued in a virtual processor queue of WU queues 188.

As noted above, in accordance with the techniques of this disclosure, one or more of accelerators 189 may be configured to evaluate regular expressions. A RegEx accelerator of accelerators 189, in accordance with the techniques of this disclosure, may include a hardware-implemented NFA engine that executes one or more NFAs constructed according to target regular expressions, i.e., regular expressions to be evaluated as part of a service. That is, the RegEx accelerator compares an input search string to a set of regular expressions, to determine whether the input search string matches any one of the set of regular expressions, as discussed in greater detail below.

After cluster manager 185 pops the work unit from the virtual processor queue of WU queues 188, cluster manager 185 delivers the work unit via a core interface to core 182A, in this example. An interface unit of core 182A then delivers the work unit to one of the virtual processors of core 182A.

Core 182A processes the work unit, which may involve accessing data, such as a network packet or storage packet, in non-coherent memory 186A and/or external memory 170. Core 182A may first look for the corresponding data in cache 198A, and in the event of a cache miss, may access the data from non-coherent memory 186A and/or external memory 170. In some examples, while processing the work unit, core 182A may store information (i.e., the network packet or data packet) associated with the work unit in an active segment of cache 198A. Further, core 182A may, while processing the work unit, prefetch data associated with a second work unit into a different, standby segment of cache 198A. When core 182A completes processing of the work unit, core 182A initiates (or causes initiation of) a cache flush for the active segment, and may also initiate prefetching of data associated with a third work unit (to be processed later) into that active segment. Core 182A (or a virtual processor within core 182A) may then swap the active segment and the standby segment so that the previous standby segment becomes the active segment for processing of the next work unit (i.e., the second work unit). Because data associated with the second work unit was prefetched into this now active segment, core 182A (or a virtual processor within core 182A) may be able to more efficiently process the second work unit. Core 182A then outputs corresponding results (possibly including one or more work unit messages) from performance of the work unit back through the interface unit of core 182A.

As described herein, in some example implementations, load store units within memory unit 183 may, concurrent with execution of work units by cores 182 within the processing cluster 180, identify work units that are enqueued in WU queues 188 for future processing by the cores. The load store units prefetch, from a non-coherent memory portion of external memory 170, data associated with the future work units and store the prefetched data associated with the WUs to be processed by the cores into a standby segment of the level 1 cache associated with the particular processing cores.

Figure 5:
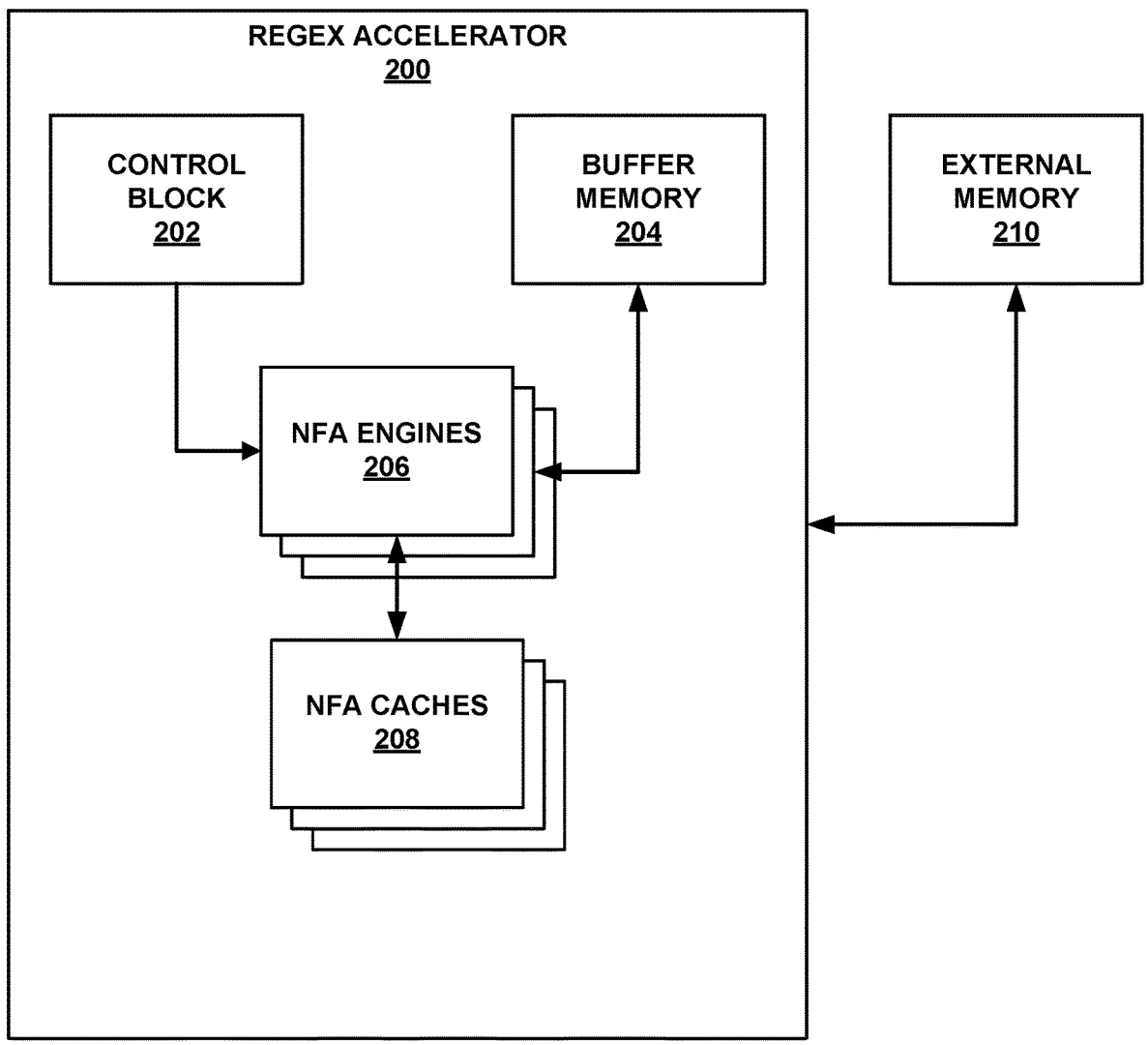
FIG. 5 is a block diagram illustrating an example regular expression (RegEx) accelerator, in accordance with the techniques of this disclosure.

FIG. 5 is a block diagram illustrating an example regular expression (RegEx) accelerator 200, in accordance with the techniques of this disclosure. RegEx accelerator 200 may correspond to one of accelerators 146 of FIG. 2 or one of accelerators 189 of FIG. 4. In this example, RegEx accelerator 200 includes control block 202, on-chip memory dedicated for RegEx accelerator 200, referred to as buffer memory 204, NFA engines 206, and NFA caches 208, which operate as high-speed on-chip cache memory for caching select NFA nodes and instructions of an NFA graph. As shown in FIG. 5, RegEx accelerator 200 is also in communication with external memory 210. External memory 210 is so named because external memory 210 is external to RegEx accelerator 200, i.e., off chip, and generally has longer memory access cycles. For example, external memory 210 may correspond to memory unit 134 of FIG. 2 (e.g., non-coherent buffer memory 138 of FIG. 2), external memory 170 of FIG. 3, or non-coherent buffer memory 186 of FIG. 4.

In general, control block 202 represents a processing unit (implemented in circuitry) that controls operation of other components of RegEx accelerator 200. For example, control block 202 may receive work units from external components (such as processing cores) to perform a comparison between target input data and a regular expression. In particular, one or more cores of a processing cluster, such as cores 182 of processing cluster 180 in FIG. 4, execute a compiler to compile a regular expression into instructions of an NFA graph (or in some cases, multiple NFA graphs, and in some cases, one or more deterministic finite automata (DFA) graphs). In this way, each instruction generated by the compiler corresponds to at least a portion of a regular expression and is a data structure that represents the pattern and/or rule matching criteria set forth within the regular expression. As described in further detail below, when compiling regular expressions, the compiler may allocate data for the instructions to on-chip buffer memory 204 and/or external memory 210, and optimizes the structure of the data based on the particular memory to which the data will be stored when used for stream processing.

In general, an NFA graph includes a set of nodes directly linked by arcs, where each node in the graph represents a state and each arch represents transitions between states based on criteria specified for the respective arc. Each node of an NFA graph may contain one or more arcs directionally linking the node to itself and/or other nodes within the NFA graph. In some examples, transitions between states may consume a symbol of a payload. In some examples, transitions between states may not consume a symbol of a payload. Transitions that do not consume a symbol may be referred to herein as epsilon (c) transitions.

As further described below, when compiling a set of regular expressions into instructions of an NFA graph, the compiler may generate macro-instructions. For example, rather than NFA engines 206 executing a first instruction for searching for the character 'a', a second instruction for searching for the character and a third instruction for searching for the character 'c' to search for the string 'abc', NFA engines 206 may executing a single instruction for searching for the string 'abc'.

In this way, the compiler may reduce a quantity of instructions used to traverse an NFA graph. The compiler thereby reduces an amount of data stored for the NFA graph, which may reduce power usage of RegEx accelerator 200. Moreover, using macro-instructions may increase a number of symbols that are processed during a single clock cycle, thereby resulting in increasing a search speed of RegEx accelerator 200.

Each of NFA engines 206 includes one or more hardware threads configured to execute respective search processes according to an NFA. Each of the threads may include, for example, one or more respective memories (e.g., registers, caches, or the like) for storing a program counter for a next instruction for an arc of an NFA and a current position of a payload data being inspected. That is, the threads may store data representing a program counter and a payload offset.

NFA engines 206 also include respective processing units for determining the current symbol and one or more subsequent symbols of the payload segment that satisfy a match condition. The threads of each of NFA engines 206 may share a common processing unit, or the threads may each include a corresponding processing unit. In general, the processing unit determines whether traversal of the NFA graph through application of the symbols of the payload results in reaching a match node of the NFA graph.

The processing unit or the thread of the corresponding one of NFA engines 206 may then update a program counter and the payload offset. The processing unit may continue this evaluation until either the entire set of payload data has been examined without satisfying a match condition, or resulting in an instruction that is a final instruction indicating a matching condition. In response to satisfying the matching condition, the thread of the one of NFA engines 206 may return data indicating that a match has been identified.

In some examples, before evaluating payload data, NFA engines 206 may load at least a portion of instructions of an NFA graph into buffer memory 204 from external memory 210 or a different computer-readable medium based on the memory allocation specified by the compiler for each of the nodes. Additionally or alternatively, NFA engines 206 may load a portion of instructions of the NFA graph into memory of a thread of the one of NFA engines 206. In particular, NFA engines 206 may be configured to receive an NFA LOAD work unit, including instructions to direct the NFA engine to load at least a portion of instructions of an NFA graph (e.g., a root of the NFA graph, and/or other portions of the NFA graph) into buffer memory 204 and/or memory of one of the threads of the NFA engines 206. The at least portion of the NFA graph may include a root node of the NFA graph and/or data representing one or more nodes and/or arcs of the nodes of the NFA graph. Likewise, NFA engines 206 may be configured to unload a loaded portion of instructions of an NFA graph from the thread memory and/or from buffer memory 204, e.g., in response to an NFA UNLOAD work unit. The NFA UNLOAD work unit may include instructions indicating that one or more loaded instructions of an NFA graph are to be removed from thread memory and/or buffer memory 204.

Accordingly, as discussed above, a thread and a processing unit of one of NFA engines 206 may perform a search in response to an NFA SEARCH work unit. In particular, the processing unit may retrieve a current symbol from payload data of the work unit stack frame, as indicated by the NFA SEARCH work unit, and ultimately output an indication of whether a match occurred to the result buffer in the work unit stack frame.

Example macro-instructions are described below. a thread of NFA engines 206 may receive one or more addresses of instructions of the NFA graph in buffer memory 204 and external memory 210, one or more addresses of "current" instruction stack to start the NFA searches, one or more addresses of a "next" instruction stack to output pending NFA searches, an address of a "top" of the current instruction stack, one or more addresses of payload buffers to be processed, and an address and size of a result buffer.

An array compare instruction may cause one of NFA engines 206 to match a fixed number of characters with consecutive payload bytes. For example, the array compare instruction may cause one of NFA engines 206 to compare characters stored in the variable-length instruction against bytes in payload. The compare may be successful if all characters compare true to the corresponding payload bytes.

A closure compare instruction may cause one of NFA engines 206 to match a label repeatedly against consecutive payload bytes. As used herein, a label may refer to, for example, but not limited to, one or more case sensitive characters, one or more case insensitive characters, a character class (e.g., a set of characters), or another label. For example, the closure compare instruction may specify two paths. A first path (e.g., path #0) of the closure compare instruction may cause one of NFA engines 206 to compare a "repeat" label with the payload byte(s) and stay at the same instruction. A second path (e.g., path #1) of the closure compare instruction may cause one of NFA engines 206 to compare an "exit" label with the payload byte and jump to the respective target address. If the first path (e.g., path #0) is taken, one of NFA engines 206 may consume the payload byte; otherwise, the payload byte is NOT consumed (e.g., matched speculatively). In some examples, one of NFA engines 206 may execute instructions for the first path of the closure compare instruction (e.g., path #0) first when the closure compare is "greedy." In some examples, one of NFA engines 206 may execute instructions for the first path of the closure compare instruction (e.g., path #0) last when the closure compare is "lazy." Upon taking a path, the closure compare instruction may cause one of NFA engines 206 to push a closure compare instruction with the index of the not taken path to the instruction stack to facilitate potential backtracking later.

A fork instruction may cause one of NFA engines 206 to branch between two to 'n' number of target instructions. The fork instruction may cause one of NFA engines 206 to update the program counter to point to a target instruction if the character specified for each path compares true to the payload byte. Instructions for a first path (e.g., Path #0) of the fork instruction may cause one of NFA engines 206 to "jump" to the following (fall-through) instruction. Other paths of the fork instruction may cause one of NFA engines 206 to jump to a respective target addresses. In all cases, the fork instruction does not consume the payload byte (e.g., matched speculatively). The fork instruction may cause one of NFA engines 206 to push a subsequent fork instruction with the index of the not taken path to the instruction stack to facilitate potential backtracking later.

A join instruction may cause one of NFA engines 206 to jump to a target instruction after matching up to 'n' number of labels. For example, the join instruction may cause one of NFA engines 206 to jump to a target instruction after matching and consuming up to 'n' number of payload bytes.

An assert instruction may cause one of NFA engines 206 to assert a character class and/or position of current and/or previous byte. For example, the assert instruction may cause one of NFA engines 206 to assert the character class values and/or positions of the current and/or the previous payload bytes.

A capture group instruction may cause one of NFA engines 206 to record capture group or make back reference to the capture group. For example, the capture group instruction may cause one of NFA engines 206 to perform one of the following operations before or after matching and consuming up to 5 payload bytes: (1) write the content of a capture group register with the current payload position; or (2) make a back reference to the payload segment specified by a pair of capture group registers.

A final instruction may cause one of NFA engines 206 to report an NFA match or jump to a "flip" target. For example, the final instruction may cause one of NFA engines 206 to report an NFA (semi-)match to the result buffer, and optionally jump to a "flip" address and reverse the payload matching direction.

While executing instructions of an NFA graph, each NFA thread may push some entries onto its private instruction stack to remember the alternative paths to walk the NFA graph, for example, in response to executing a join instruction or closure compare instruction.

Figure 6:
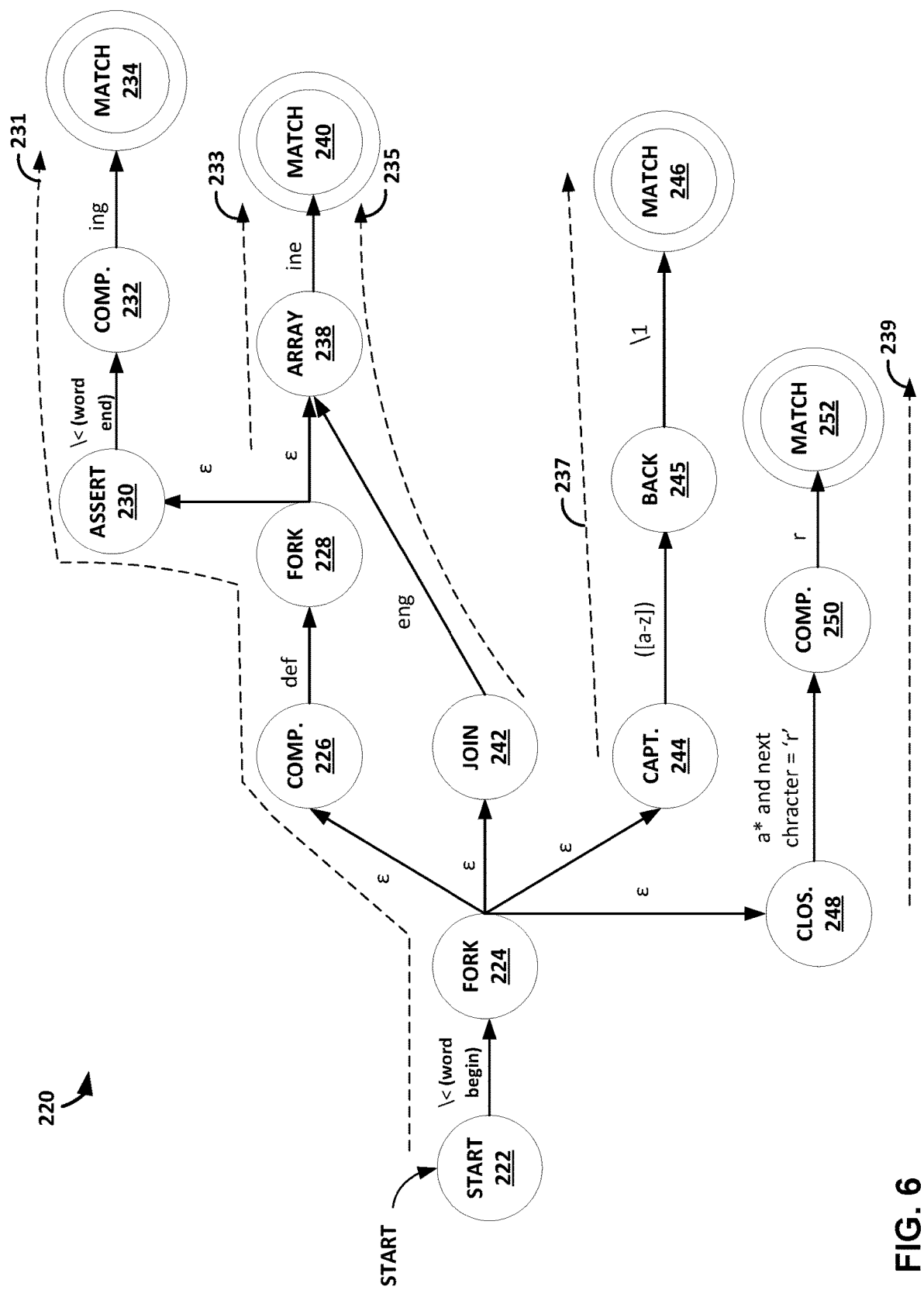
FIG. 6 is a conceptual diagram illustrating an example non-deterministic finite automata (NFA) graph.

FIG. 6 is a conceptual diagram illustrating an example NFA 220. As noted above, an NFA graph may represent a set of regular expressions. That is, as noted above, one or more cores of a processing cluster, such as cores 182 of processing cluster 180 in FIG. 4, execute one or more instructions of an NFA graph. In general, NFA graphs include nodes (representing states) with arcs (directed links representing transitions) pointing from one node to one or more nodes. Each arc is represented by a macro-instruction. Each node represents an instruction state (e.g., a program counter value). In the example of FIG. 6A, NFA 220 includes nodes 222-252. Each transition (e.g., arc) from one node to another node may be represented by an instruction. In some cases, arcs are labeled with epsilon ('ε') to denote non-deterministic transitions between states represented by corresponding nodes of NFA 220. In general, an NFA engine may traverse an arc labeled with an epsilon transition without consuming a symbol of the payload being analyzed. In other cases, arcs are labeled with an instruction, which may represent one of the various types of instructions described in this disclosure (e.g., an array compare instruction, closure compare instruction, join instruction, assert instruction, and capture group instruction).

In the example of FIG. 6, node 222 of NFA 220 represents a start node, as indicated by the label "START." Node 222 has an arc to node 224 with label "\<(word begin).' For example, a compiler may generate an assert instruction defining a character class of a word and an offset equal to the beginning of the word. As used herein, a compiler may refer to, for example, but not limited to, processing cluster 180, an offline stream of instructions received from a memory, central cluster 158, or another compiler. Node 224 has epsilon transitions ('ε') to nodes 226, 242, 244, and 248. As previously mentioned, epsilon transitions do not consume symbols. For example, the compiler may generate a fork instruction defining a first sub-path to node 226, a second sub-path to node 242, a third sub-path to node 244, and fourth sub-path to node 248.

Node 226 has an arc to node 228 with label 'def.' For example, the compiler may generate an array compare instruction defining the character string 'def.' Node 228 has epsilon transitions ('ε') to nodes 230 and 238. For example, the compiler may generate a fork instruction defining a first sub-path to node 230, a second sub-path to node 238. Node 230 has an arc to node 232 with label "\<(word end).' For example, the compiler may generate an assert instruction defining a character class of a word and an offset equal to the end of the word. Node 232 has an arc to node 234 with label 'ing.' For example, the compiler may generate an array compare instruction defining the character string 'ing.' Node 234 is a match node. In this example, the compiler may generate a final instruction that causes an NFA engine to report an NFA match condition to a result buffer. As such, the combination of instructions along path 231 searches for a word beginning with 'def' and ending in 'ing'.

In the example of FIG. 6., the NFA engine saves an instruction state (e.g., a program counter value, payload offset value, etc.) at node 228. As such, an NFA engine may execute processing path 233 without repeating instructions executed when processing path 231. For instance, the NFA engine may omit repeating a processing instructions representing arcs for nodes 222, 224, and 226. Node 238 has an arc to node 240 with label 'ine.' For example, the compiler may generate an array compare instruction defining the character string 'ine.' Node 240 is a match node. In this example, the compiler may generate a final instruction that causes an NFA engine to report an NFA match to a result buffer. As such, the combination of instructions along path 233 and a portion of path 231 searches for 'define'.

In the example of FIG. 6., the NFA engine saves an instruction state (e.g., a program counter value, payload offset value, etc.) at node 224. As such, an NFA engine may execute process path 235 without repeating instructions executed when processing path 231. For instance, the NFA engine may omit processing instructions representing arcs for nodes 222 and 224. Node 242 has an arc to indicating a jump or "join" to node 238 with label 'eng.' For example, the compiler may generate a join instruction defining the characters 'eng' and an instruction address representing node 238. As noted above, node 238 has an arc to node 240 with label 'ine' and node 240 is a match node. In this example, the compiler may generate a final instruction that causes an NFA engine to report an NFA match condition to a result buffer. As such, the combination of instructions along path 235 and a portion of path 231 searches for 'engine'.

Node 244 has an arc to node 245 with label '(a-z)'. For example, the compiler may generate a capture group instruction for storing a symbol for any lower case letter of the set of characters from the letter 'a' to the letter 'z' as a first capture group. Node 245 has an arc to node 246 with label \1'. For example, the compiler may generate a back reference instruction defining the first capture group. Node 246 is a match node. In this example, the compiler may generate a final instruction that causes an NFA engine to report an NFA match to a result buffer. As such, the combination of instructions along path 237 and a portion of path 231 searches for a word beginning with a lower case letter and has a subset letter matching to the lower case letter.

Node 248 has an arc to node 250 with label 'a*' and an indication that a next character to match is 'r'. For example, the compiler may generate a closure compare instruction defining zero or more characters 'a' and a pattern character 'r'. Node 250 has an arc with label 'r'. For example, the compiler may generate an array compare instruction defining the character 'r'. Node 252 is a match node. In this example, the compiler may generate a final instruction that causes an NFA engine to report an NFA match to a result buffer. As such, the combination of instructions along path 239 and a portion of path 231 searches for a word beginning with zero or more characters 'a' followed by the lower case letter 'r'.

Figure 7:
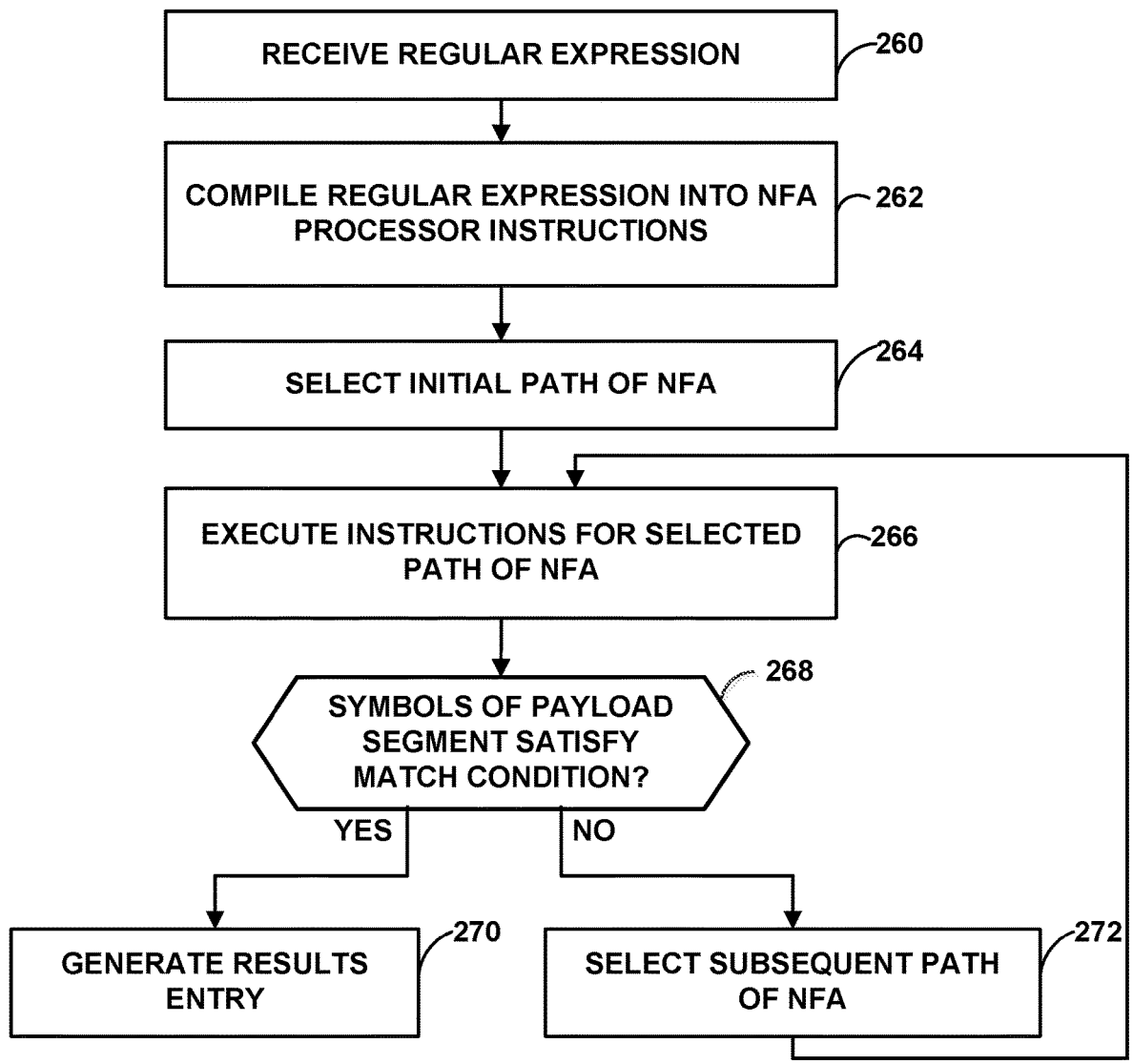
FIG. 7 is a flowchart illustrating example techniques for performing a regular expression search for multiple paths of an NFA graph according to the techniques of this disclosure.
Figure 20:
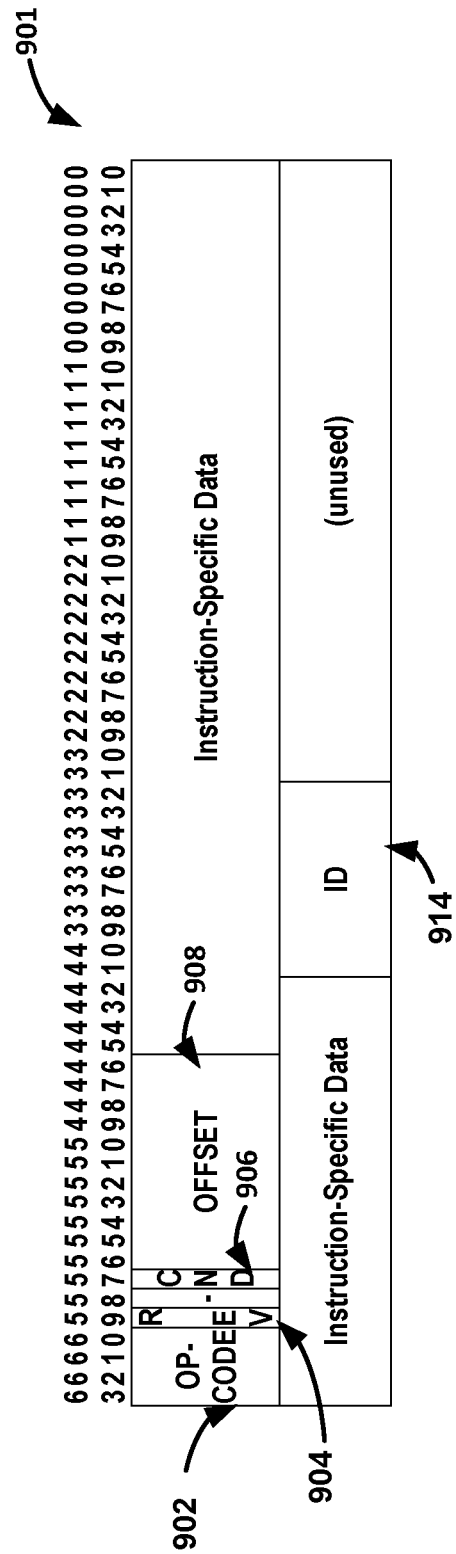
FIG. 20 is a conceptual diagram illustrating an example NFA instruction stack entry according to the techniques of this disclosure.

FIG. 7 is a flowchart illustrating example techniques for performing a regular expression search for multiple paths of an NFA graph according to the techniques of this disclosure. Initially, one or more cores of a processing cluster, such as cores 182 of processing cluster 180 in FIG. 4, executes a compiler that receives a regular expression (260). In some examples, the compiler may be executing offline. In some examples, the compiler may be executing on one or more cores of a processing cluster. In some examples, the compiler may be executing on one or more cores of a central cluster. In some examples, the compiler may be executing on host processor connected via PCIe to DPU 130. In some examples, the compiler may be executing on a different offline computer. The compiler compiles the regular expression into an NFA processor instruction (262), such as NFA 220 of FIG. 6. For example, processing cluster 180 may generate a "current" stack of NFA instruction stack entries representing NFA 220. An example of an NFA instruction stack entry is shown in FIG. 20. An NFA thread of one of NFA engines 206 selects an initial path of NFA 220 (264). For example, the NFA thread may process path 231.

The NFA thread executes instructions for the selected path (266). To execute the instructions, the NFA thread may compare the values of the instructions to symbols of the payload (except in the case of the epsilon transition). For example, the NFA thread may execute an assert instruction of an arc from node 222 to node 224. For instance, executing the assertion instruction may include comparing a class of values (e.g., a word) and an offset (e.g., a beginning of the word) specified by the assert instruction with values of symbols of a payload segment. In this example, the NFA thread may execute a fork instruction of an arc from node 224 to node 226. For instance, executing the fork instruction may non-deterministically transition from node 224 to node 226 and push a subsequent fork instructions of non-deterministic transitions from node 224 to node 242, node 224 to node 244, and node 224 to node 248 into an instruction stack. In this example, the NFA thread may execute an array compare instruction of an arc from node 226 to node 228. For instance, executing the array compare instruction may compare values (e.g., the character string "def") specified by the array compare instruction with values of symbols of a payload segment. In this example, the NFA thread may execute a fork instruction of an arc from node 228 to node 230. For instance, executing the fork instruction may non-deterministically transition from node 228 to node 230 and push a subsequent fork instruction of non-deterministic transitions from node 228 to node 238. In this example, the NFA thread may execute an assert instruction of an arc from node 230 to node 232. For instance, executing the assertion instruction may include comparing a class of values (e.g., a word) and an offset (e.g., an end of the word) specified by the assert instruction with values of symbols of a payload segment. In this example, the NFA thread may execute an array compare instruction of an arc from node 232 to node 234. For instance, executing the array compare instruction may compare values (e.g., the character string "ing") specified by the array compare instruction with values of symbols of a payload segment. The executing of instructions may continue in this manner until either match node 234 is reached, or until the symbol(s) of the payload do not match the corresponding instruction for an arc from one node to another.

The NFA thread may determine whether symbols of the selected path satisfy a match condition for the path (268). For example, the NFA thread may determine that the match condition for path 231 is satisfied when each of the instructions for the selected path 231 (e.g., a subset of instruction) is satisfied to the final instruction for node 234. In response to determining that symbols of a payload segment satisfy a match condition ("YES" branch of 268), the NFA thread may generate a results entry (270). For example, the NFA thread may execute a final instruction for node 234. In response to determining that symbols of the selected path do not satisfy the match condition ("NO" branch of 268), the NFA thread may select a subsequent path of the NFA graph (272) and repeat steps 266-268 using the subsequent path as the selected path. For example, the NFA thread may select path 233 of NFA 220 and repeat steps 266-268, assuming the symbols of the payload do not result in reaching node 234 along path 231 when compared to the instructions for the arcs along path 231.

Figure 8:
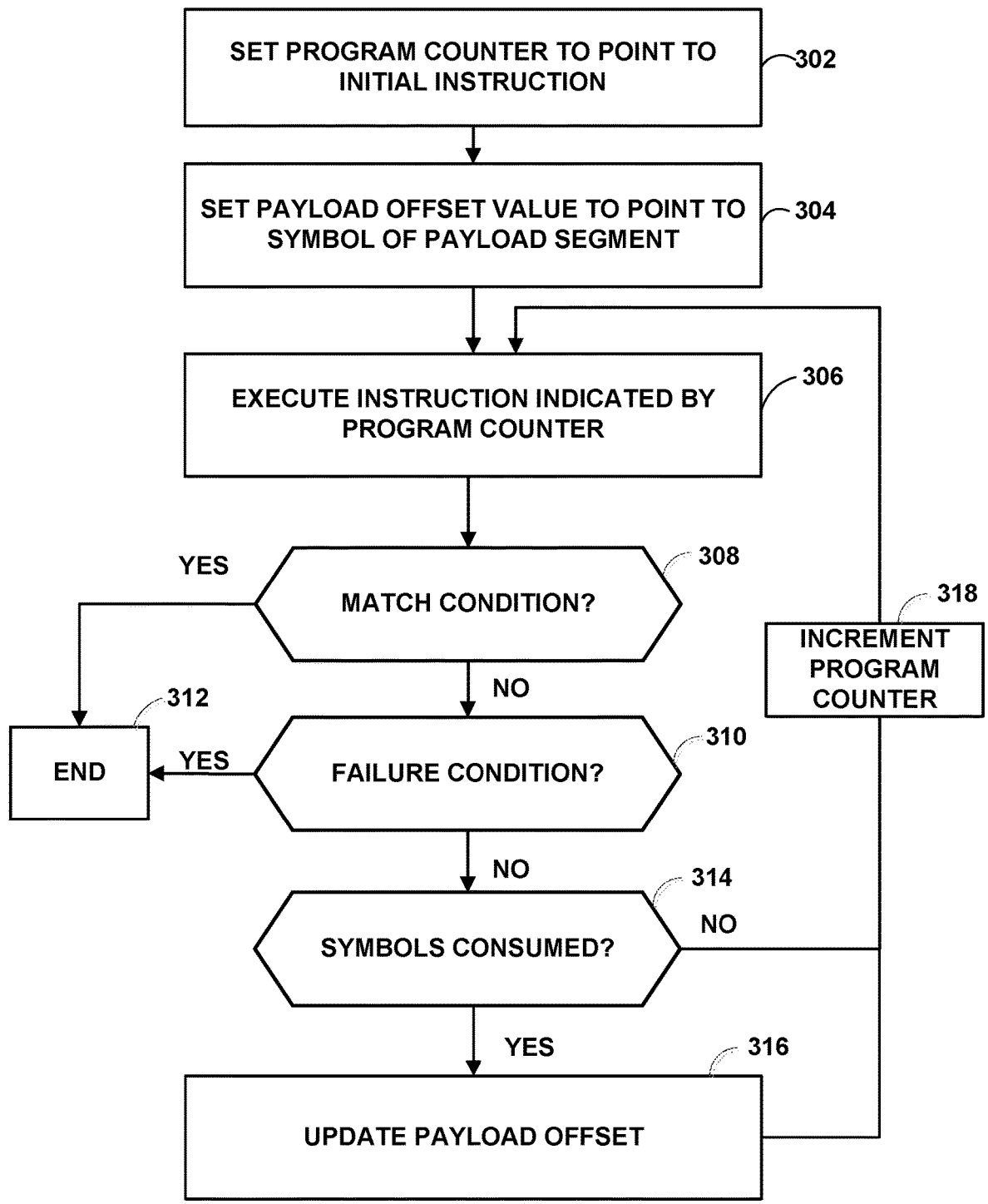
FIG. 8 is a flowchart illustrating example techniques for processing instructions for a path of an NFA graph according to the techniques of this disclosure.

FIG. 8 is a flowchart illustrating example techniques for processing instructions for a path of an NFA graph according to the techniques of this disclosure. The process of FIG. 8 represents an example of step 266 of FIG. 7. Initially, an NFA thread of NFA engine 206 sets a program counter to point to an initial instruction (302). For example, the thread sets the program counter to point to an assert instruction representing node 222. The NFA thread sets a payload offset value to a point to a symbol of a payload segment (304). For example, the thread sets the payload offset value to indicate a first symbol of a payload segment. The NFA thread executes the instruction indicated by the program counter (306). For example, the NFA thread executes the assert instruction representing node 222. The NFA thread determines whether the instruction indicated by the program counter, referred to herein as a next instruction, indicates a match condition (308). For example, NFA thread determines whether the instruction representing node 222 is a final instruction. In response to determining that the instruction indicated by the program counter indicates that a match condition is satisfied, the process ends 312 ("YES" branch of 308). For example, the NFA thread determines that symbols of the selected path do satisfy the match condition ("YES" branch of 268 of FIG. 7).

In response to determining that the instruction indicated by the program counter does not indicate a match condition ("NO" branch of 308), the NFA thread determines whether the instruction indicated by the program counter indicates a failure condition (310). For example, the NFA thread may determine that a failure condition has occurred when the assert instruction representing node 222 determines that a symbol of the payload segment pointed to by the payload offset does not satisfy a word class. In response to determining that the instruction indicated by the program counter indicates a failure condition ("YES" branch of 310), the process ends 312. For example, in response to the NFA thread determining that symbols of the payload segment do not satisfy an array instruction specifying a string abc', the NFA thread proceeds to end 312.

In response, however, to determining that the next instruction indicated by the program counter does not indicate a failure condition ("NO" branch of 310), the NFA thread determines whether executing the next instruction consumed at least one symbol (314). In response to determining that the executing the next instruction consumed at least one symbols ("YES" branch of 314), the NFA thread updates the payload offset (316), increments the program counter (318) and proceeds to (306). In response, however, to determining that the executing the next instruction did not consume at least one symbols ("NO" branch of 314), the NFA thread increments the program counter (318) and proceeds to (306).

Figure 9:
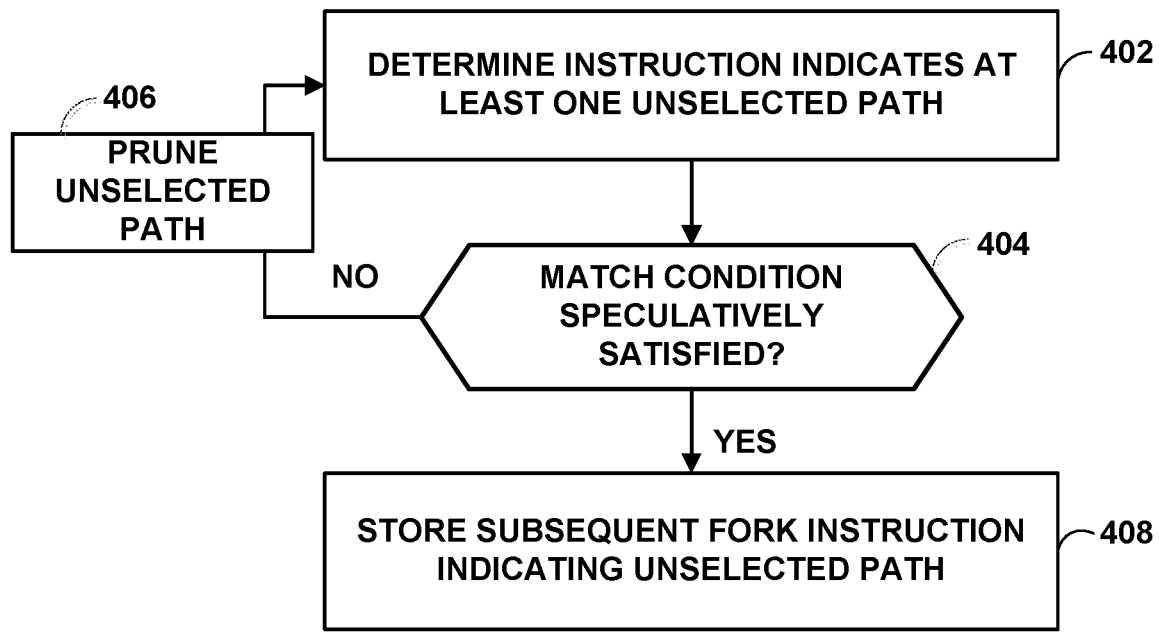
FIG. 9 is a flowchart illustrating example techniques for pruning instructions for a subsequent path of an NFA graph according to the techniques of this disclosure.

FIG. 9 is a flowchart illustrating example techniques for pruning instructions for a subsequent path of an NFA graph according to the techniques of this disclosure. For example, FIG. 9 may illustrate details of executing an instruction for 306 of FIG. 8. Initially, an NFA thread of one of NFA engines 206 determines an instruction indicates at least one unselected path (402). For example, in response to executing a fork instruction representing node 228 of FIG. 6 that specifies an arc along path 231 to node 230 and an arc along path 233 to node 238 and selecting the arc along path 231 to node 230, the NFA thread determines that path 233 is an unselected path. The NFA thread determines whether a match condition for the unselected path is speculatively satisfied (404). In response to determining that a match condition for the unselected path is not speculatively (e.g., without consuming a symbol) satisfied ("NO" branch of 404), the NFA thread may repeat to 402 for another unselected path. For example, in response to determining that a next symbol is not 'i' and that an array compare instruction representing node 238 specifies the character string "ine", the thread may "prune" or refrain from generating an instruction to processing path 233 of FIG. 6.

In response, however, to determining that a match condition for the unselected path is speculatively satisfied ("YES" branch of 404), the NFA thread may store a subsequent fork instruction indicating the unselected path (408). For example, in response to determining that a next symbol is 'i' and that an array compare instruction representing node 238 specifies the character string "ine", the NFA thread may add a fork instruction indicating the unselected path. For example, the NFA thread may add a subsequent fork instruction indicating path 233 of FIG. 6. The subsequent fork instruction may indicate an instruction state (e.g., a program counter value, payload offset, etc.). Moreover, in some example, the NFA thread may initially add the subsequent fork instruction to a current instruction stack. In response to determining that the current path fails, the NFA thread may generate a next instruction stack that indicates the subsequent fork instruction.

Figure 10:
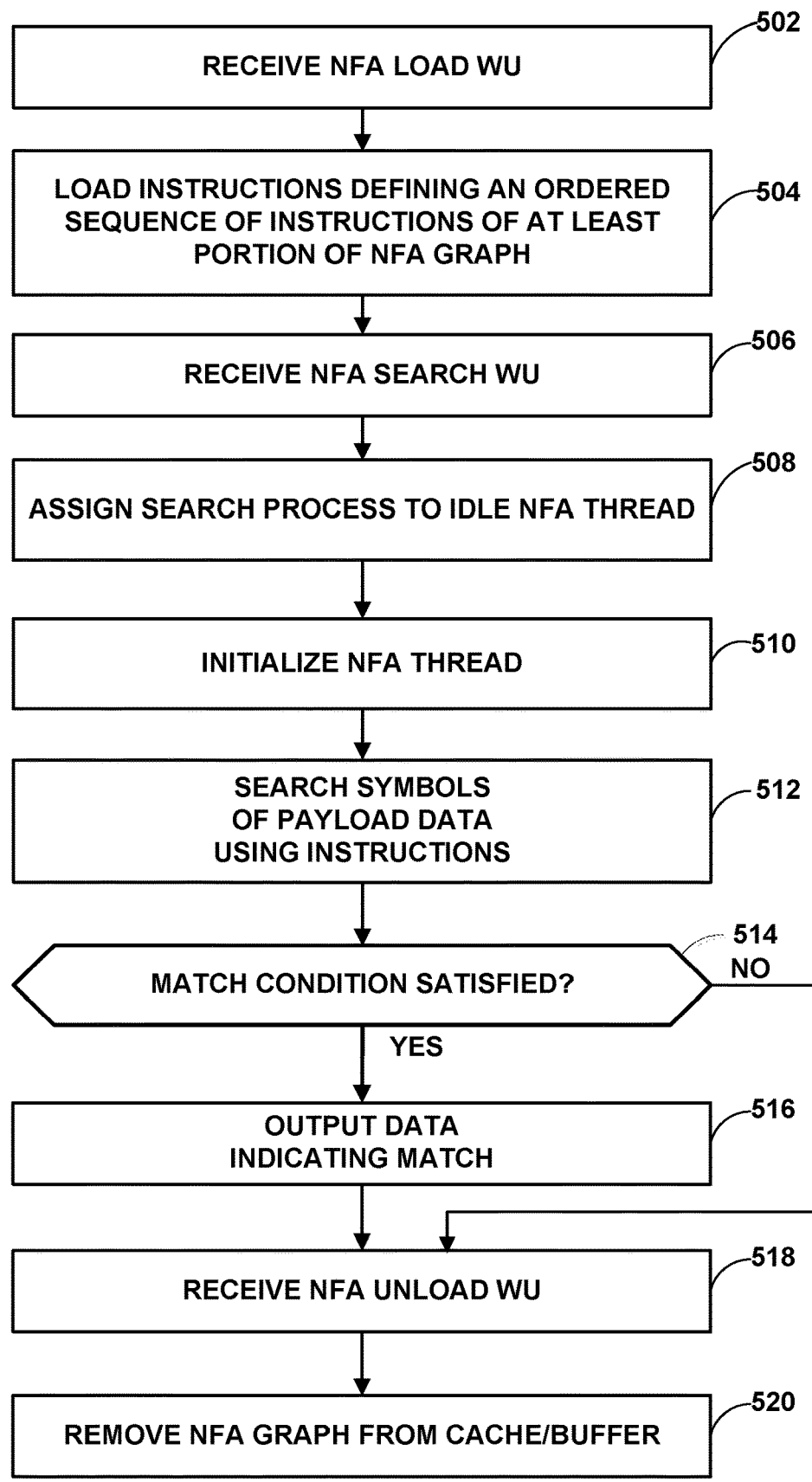
FIG. 10 is a flowchart illustrating example techniques for performing a regular expression search using an NFA thread according to the techniques of this disclosure.

FIG. 10 is a flowchart illustrating example techniques for performing a regular expression search using an NFA thread according to the techniques of this disclosure. The techniques of FIG. 10 may be performed by, e.g., the components of RegEx accelerator 200 as discussed below, or other devices in other examples.

Initially, RegEx accelerator 200 receives an NFA LOAD work unit (WU) (502). As discussed above, the NFA LOAD work unit may specify instructions defining an ordered sequence of instructions of at least a portion of an NFA graph to be loaded into, e.g., buffer memory 204 and/or one of NFA caches 208. In response to the NFA LOAD work unit, control block 202 may cause one of NFA engines 206 to load instructions defining an ordered sequence of instructions of at least a portion of an NFA graph (504), e.g., into buffer memory 204 and/or into a corresponding one of NFA caches 208. In this manner, the one of NFA engines 206 stores at least a portion of instructions of an NFA graph to an NFA buffer of a memory, the portion of the NFA graph comprising a plurality of instructions arranged along a plurality of paths.

After loading the portion of the NFA graph, RegEx accelerator 200 receives an NFA SEARCH work unit (506). The NFA SEARCH work unit, as discussed above, specifies payload data to be compared to the instructions. In response to receiving the NFA SEARCH work unit, control block 202 directs the work unit to one of NFA engines 206, which assigns the search to an idle hardware thread thereof (508). The one of NFA engines 206 also initializes the NFA thread (510). For example, using data of the NFA SEARCH work unit, the one of NFA engines 206 sets a value of a program counter for the thread to represent a next instruction (e.g., a start instruction) of the instructions and a value of a payload offset to represent a current byte of the payload (e.g., a starting symbol of the payload). The one of NFA engines 206 may further maintain data representing a location of a result buffer to which output data is to be written as a result of performing the search.

The NFA thread of the one of NFA engines 206 may then search symbols of the payload data using the instructions (512). In particular, the NFA thread may determine (or cause a processing unit of the one of NFA engines 206 to determine) the current symbol and one or more subsequent symbols of the payload segment that satisfy a match condition specified by the subset of instructions of the instructions for a first path of a plurality of paths for the NFA graph. In this manner, the NFA thread determines a value of a program counter representing a next instruction of a plurality of instructions of the NFA graph, and a value of a payload offset memory representing a position of current symbol in a sequence of symbols of payload data.

The NFA thread may determine whether a match condition is satisfied (514). For example, in response to processing a final instruction representing a node of the NFA graph, the NFA thread may determine a match condition is satisfied. In response to satisfying the match condition ("YES" branch of 514), the NFA thread may output data indicating that a match has occurred (516). In some examples, the NFA thread outputs data for each match that has occurred. For example, the NFA thread may write data to the result buffer, as discussed above. If the match condition is not satisfied for the entire payload segment, in some examples, the NFA thread outputs data indicating that no match has occurred, and that the payload segment has ended. In this manner, in response to updating the value of the program counter to correspond to a final instruction, the NFA thread outputs an indication that the payload data has satisfied a match condition.

At some point after performing the search, the one of NFA engines 206 receives an NFA UNLOAD work unit (518). In response to the NFA UNLOAD work unit, the one of NFA engines 206 removes the NFA graph data from the corresponding one of NFA caches 208 and/or buffer memory 204 (520).

Figure 11:
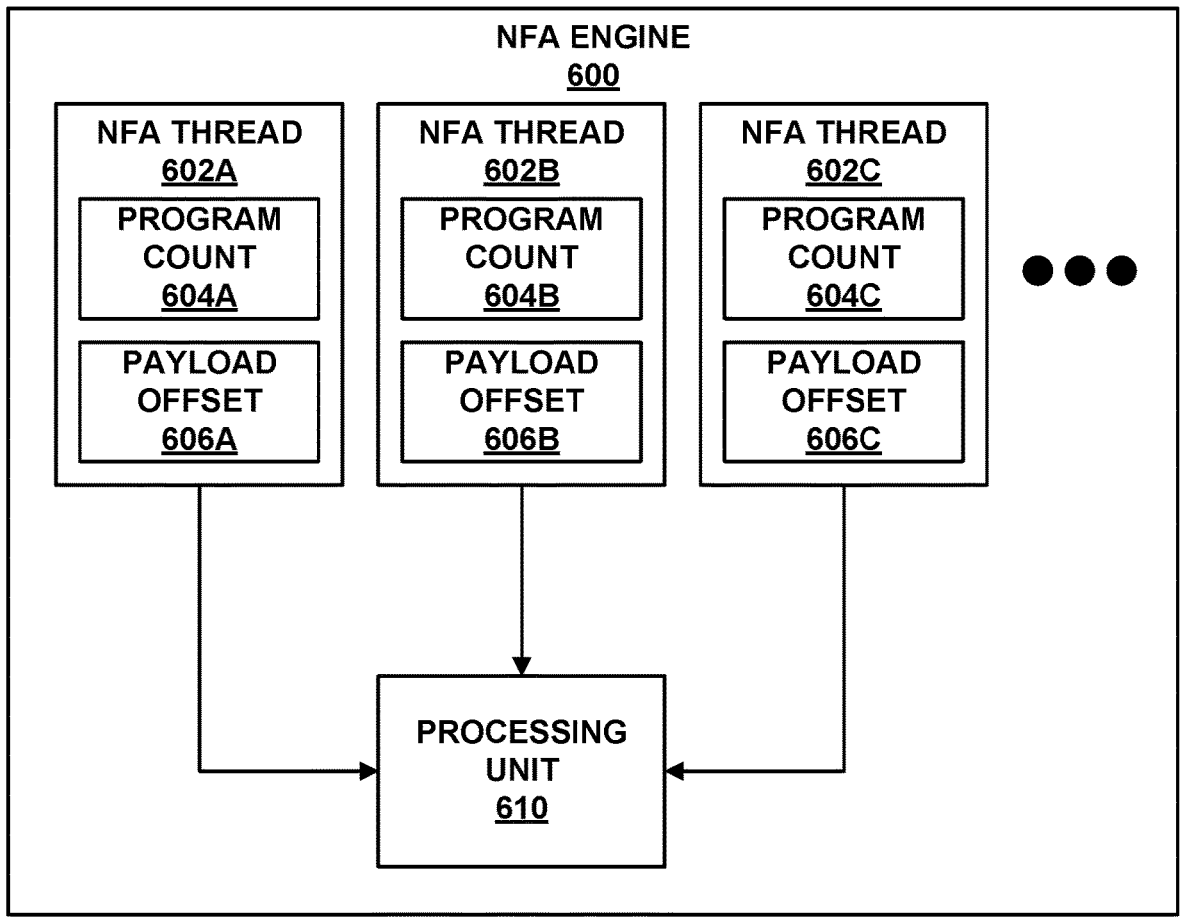
FIG. 11 is a block diagram illustrating an example NFA engine.

FIG. 11 is a block diagram illustrating an example NFA engine 600. NFA engine 600 may correspond to one of NFA engines 206 of FIG. 5. In this example, NFA engine 600 includes hardware NFA threads 602A-602C (NFA threads 602). Each of NFA threads 602 includes respective program counters 604A-604C (program counters 604) and respective payload offsets 606A-606C (payload offsets 606). In addition, NFA engine 600 includes processing unit 610.

As discussed above, NFA threads 602 generally maintain a respective program counters and payload offsets 606 for a current search process. NFA thread 602A, for example, may store data representing an instruction for a current node of an NFA graph as program counter 604A, and a position of a current symbol of payload data being compared to the NFA graph as payload offset 606A. Although the example of FIG. 11 illustrates each NFA thread of NFA threads 602 as using a single processing unit 610, in some examples, each NFA thread of NFA threads 602 may include a respective processing unit. NFA thread 602A may then cause processing unit 610 to execute the instruction indicated by program counters 604A using the one or more values of the current symbol and zero or more subsequent values indicated by payload offset 606A. NFA thread 602A may cause processing unit 610 to update program counter 604A based on the instruction. For instance, if the instruction is a join instruction, NFA thread 602A may cause processing unit 610 to update program counter 604A to an address specified by the join instruction when one or more labels specified by the join instruction matches the current symbol and zero or more subsequent values indicated by payload offset 606A. NFA thread 602A may cause processing unit 610 to update payload offset 606A based on the instruction. For instance, if the instruction is a join instruction specifying the character string 'abed', NFA thread 602A may cause processing unit 610 to increment payload offset 606A by four characters when the character string specified by the join instruction matches the current symbol and three subsequent values indicated by payload offset 606A.

As noted above, NFA engine 600 may be included in RegEx accelerator 200, which may be included in a processing device, such as one of access nodes 17 (FIG. 1), DPU 130 (FIG. 2), or DPU 150 (FIG. 3). Accordingly, these processing devices represent examples of a processing device including a memory including a NFA buffer configured to store a plurality of instructions defining an ordered sequence of instructions of at least a portion of an NFA graph, the portion of the NFA graph comprising a plurality of nodes arranged along a plurality of paths. The processing device also includes an NFA engine implemented in circuitry, the NFA engine comprising one or more NFA threads implemented in circuitry, each of the NFA threads comprising: a program counter storing a value defining a next instruction of the plurality of instructions; and a payload offset memory storing a value defining a position of a current symbol in an ordered sequence of symbols of a payload segment of payload data. The NFA engine further includes a processing unit configured to determine the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions and in response to determining the current symbol and the one or more subsequent symbols of the payload segment that satisfy the match condition, output an indication that the payload data has resulted in a match.

Figure 12:
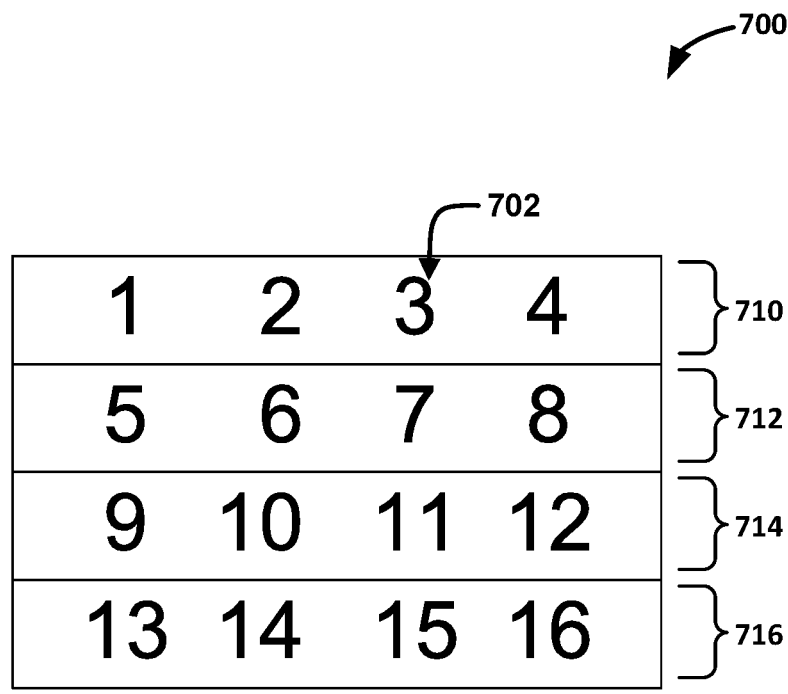
FIG. 12 is a conceptual diagram illustrating an example of prefetching instructions according to the techniques of this disclosure.

FIG. 12 is a conceptual diagram illustrating an example of prefetching instructions according to the techniques of this disclosure. In this example, instructions 700 include a first subset 710 of instructions, a second subset of instructions 712, a third subset of instructions 714, and a fourth subset of instructions 716. In some examples, buffer memory 204 of FIG. 5 stores first subset 710 of instructions. In this example, external memory 210 of FIG. 5 stores second subset of instructions 712, a third subset of instructions 714, and a fourth subset of instructions 716.

In the example of FIG. 12, NFA thread of NFA engine 206 may execute each instruction of subset 710. Before processing a final instruction of subset 710, the NFA thread may prefetch subset 712 from external memory 210 for storage at NFA caches 208. For instance, the NFA thread may prefetch subset 712 upon completing execution instruction 702. In this way, the NFA thread may reduce a processing time for executing instruction 700.

NFA engine 206 may use a Least Recently Used (LRU) scheme to evict instructions from caches 208. For example, NFA engine 206 may evict one or more first instructions from caches 208 to buffer memory 204 based on when the one or more first instructions were least recently used by NFA engine 206. In some examples, NFA engine 206 may evict one or more second instructions from buffer memory 204 to external memory 210 based on when the one or more second instructions were least recently used by NFA engine 206.

Figure 13:
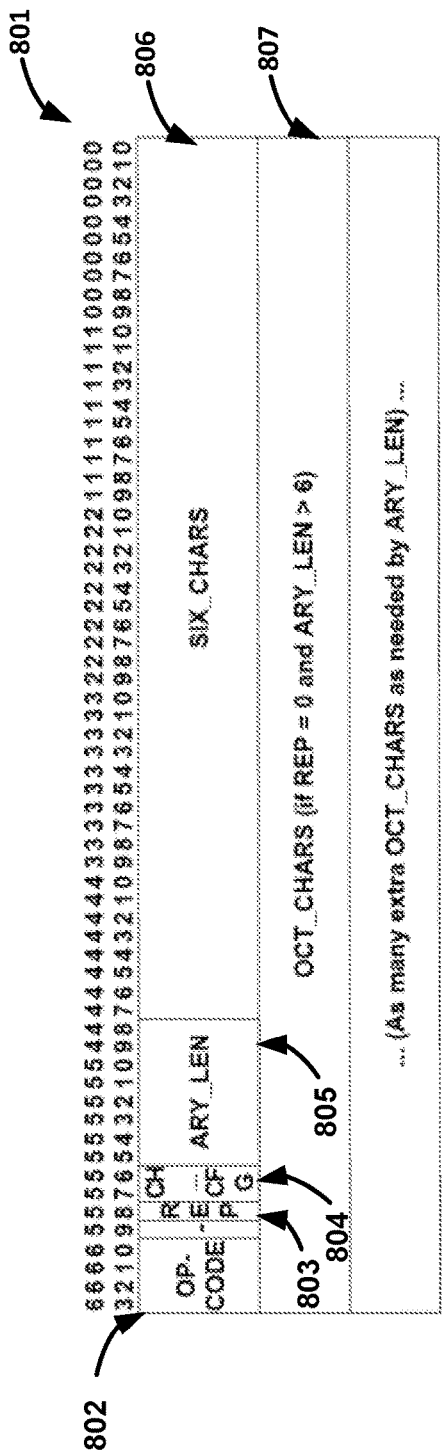
FIG. 13 is a conceptual diagram illustrating an example array compare instruction according to the techniques of this disclosure.

FIG. 13 is a conceptual diagram illustrating an example array compare instruction 801 according to the techniques of this disclosure. Opcode 802 specifies a 4-bit identification opcode mechanism for array compare instruction 801. For instance, opcode 802 may be specified as '4'h1'. REP 803 specifies every payload byte is compared to one pattern character when set to '0' and specifies all payload bytes are compared to SIX_CHARS of ARY_LEN 805 when set to '1'. CH_CFG 804 specifies all characters are exact match when set to '00', specify that all characters are case insensitive match when set to '01', and specifies that all characters are character classes when set to '10'. ARY_LEN 805 specifies a number of bytes to be compared in the payload. SIX_CHARS 806 specifies up to 6 pattern characters if REP 803=0 and specify the character to be repeatedly matched if REP 803=1. OCT_CHARS 807 specifies a remaining pattern characters if REP 803 is set to '0' and ARY_LEN 805 is greater than 6.

A thread of NFA engine 206 may execute array compare instruction 801 to cause NFA engine 206 to determine a current symbol and one or more subsequent symbols of a payload segment comprise a subset of symbols corresponding to a character string specified by the array compare instruction. For instance, NFA engine 206 may determine a current symbol and one or more subsequent symbols of a payload segment comprise a subset of symbols corresponding to SIX_CHARS 805.

Figure 14:
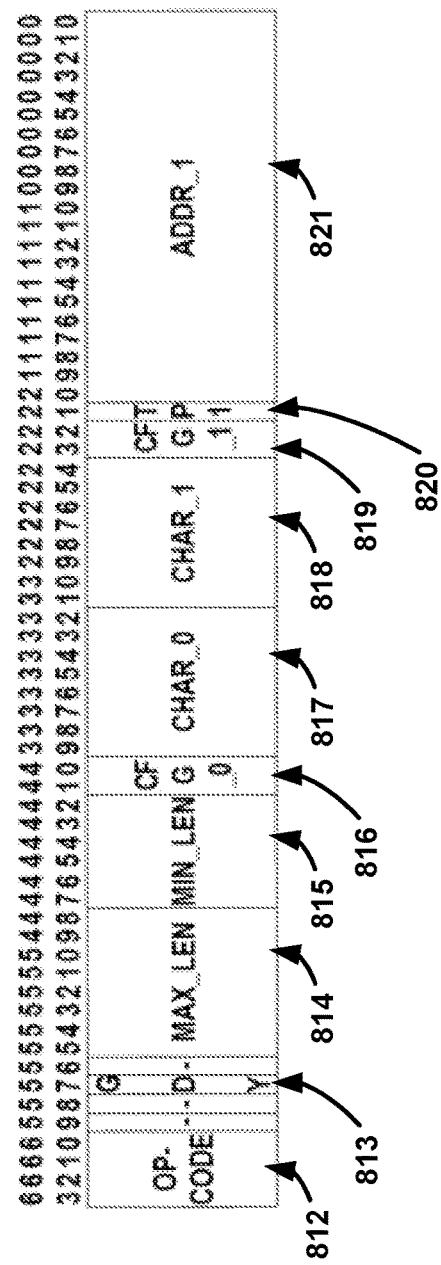
FIG. 14 is a conceptual diagram illustrating an example closure compare instruction according to the techniques of this disclosure.

FIG. 14 is a conceptual diagram illustrating an example closure compare instruction 811 according to the techniques of this disclosure. Opcode 812 specifies a 4-bit identification opcode mechanism for closure compare instruction 811. For instance, opcode 812 may be specified as '4'h3'. GDY 813 specifies to try to speculatively match CHAR_1 818 before repeatedly matching CHAR_0 817 when set to '0' and to try to repeatedly match CHAR_0 817 before speculatively matching CHAR_1 818 when set to '1'. MAX_LEN 814 specifies a maximum number of times to repeatedly match CHAR_0 817 when set greater than '0x00' or to repeatedly match CHAR_0 817 as many times as possible (a star closure) when set to '0x00'. MIN_LEN 815 specifies a minimum number of times to repeatedly match CHAR_0 817. CFG_0 816 specifies that CHAR_0 817 is an exact byte when set to '00', that CHAR_0 817 is a case insensitive byte when set to '01', that CHAR_0 817 is a character class when set to '10', and that CHAR_0 817 is ignored for speculative matching (always compares true) when set to '11'. CHAR_0 817 specifies a pattern character to repeatedly match the payload byte. CFG_1 819 specifies that CHAR_1 818 is an exact byte when set to '00', CHAR_1 818 is a case insensitive byte when set to '01', CHAR_1 818 is a character class when set to '10', and CHAR_1 818 is ignored for speculative matching (always compares true) when set to '11. CHAR_1 818 specifies a pattern character to speculatively match the payload byte for another path. ADDR_1 821 specifies a target address for another path when TP1 820 is set to '1'. If TP1 820 is set to '0', ADDR_1 821 is an external memory address, for instance, for external memory 210 of FIG. 5 and if TP1 820 is set to '1', ADDR_1 821 specifies a buffer memory address, for instance, for buffer memory 204 of FIG. 5.

A thread of NFA engine 206 may execute closure compare instruction 811 to cause NFA engine 206 to determine a current symbol and one or more subsequent symbols comprise a subset of symbols corresponding to the single character for the threshold range of symbols and a pattern character speculatively matches a symbol immediately following the one or more subsequent symbols. For instance, NFA engine 206 may determine a current symbol and one or more subsequent symbols comprise a subset of symbols corresponding to CHAR_0 817 for a threshold range of symbols specified by MIN_LEN 815 and MAX_LEN 814 and the CHAR_1 818 speculatively matches a symbol immediately following the one or more subsequent symbols.

FIG. 15 is a conceptual diagram illustrating an example fork instruction 831 according to the techniques of this disclosure. Opcode 832 specifies a 4-bit identification opcode mechanism for fork instruction 831. For instance, opcode 832 may be specified as '4'h2'. EXT 833 specifies that fork instruction 831 has only one instruction word when set to '0' and that fork instruction 831 has an extra instruction word when set to '1'. FTR 834 specifies a fall-through address (the FORK's last word addr+1) is not a valid target when set to '0' and a fall-through address (the FORK's last word addr+1) is a valid target when set to '1'. CFG_0 835 is not used when FTR 834 is set to '0' and specifies a character config for CHAR_0 836 when FTR 834 is set to '1'. CHAR_0 836 is unused when FTR is set to '0' and specifies a pattern char to speculatively match the payload byte for fall-through path when FTR is set to '1'. CFG_1 838 specifies a character config for CHAR_1 837. In some examples, CFG_0 835, CFG_1 838, CFG_2 843, and/or CFG_3 846 may be a character, a case insensitive character, or a character class. CHAR_1 837 specifies pattern characters to speculatively match the payload byte for path #1. ADDR_1 840 specifies a target address for path #1. If TP1 839 is set to '0', ADDR_1 840 specifies an external memory address, for instance, for external memory 210 of FIG. 5 and if TP1 839 is set to '1', ADDR_1 840 specifies a buffer memory address, for instance, for buffer memory 204 of FIG. 5.

CFG_2 843 specifies a character config for CHAR_2 844. CFG_3 846 specifies a character config for CHAR_3 845. CHAR_2 844 specifies pattern characters to speculatively match the payload byte for path #2. CHAR_3 845 specifies pattern characters to speculatively match the payload byte for path #3. ADDR_2 842 specifies a target address for path #2. If TP2 841 is set to '0', ADDR_2 842 specifies an external memory address, for instance, for external memory 210 of FIG. 5 and if TP2 841 is set to '1', ADDR_2 842 specifies a buffer memory address, for instance, for buffer memory 204 of FIG. 5. ADDR_3 848 specifies a target address for path #3. If TP3 847 is set to '0', ADDR_3 848 specifies an external memory address, for instance, for external memory 210 of FIG. 5 and if TP3 847 is set to '1', ADDR_3 848 specifies a buffer memory address, for instance, for buffer memory 204 of FIG. 5. If ADDR_3 848 is set to '0x1fffff' (invalid address), fork instruction 831 specifies that there is no path #3.

A thread of NFA engine 206 may execute fork instruction 831 to cause NFA engine 206 to update a program counter to point to an instruction of the subset of instructions corresponding to a first sub-path in response to determining that the current symbol speculatively satisfies a match condition of a first instruction for the first path. For instance, NFA engine 206 may update program counter 604A of FIG. 11 to point to ADDR_1 840 in response to determining that the current symbol speculatively matches CHAR_1 837. Similarly, a thread of NFA engine 206 may execute fork instruction 831 to cause NFA engine 206 to update a program counter to point to an instruction of the subset of instructions corresponding to a second sub-path in response to determining that the current symbol speculatively satisfies the match condition of the second instruction for the second path and the current symbol does not speculatively satisfy the match condition of the first instruction for the first path. For instance, NFA engine 206 may update program counter 604A of FIG. 11 to point to ADDR_2 842 in response to determining that the current symbol does not speculatively match CHAR_1 837 and that the current symbol speculatively matches CHAR_2 844.

In some examples, a thread of NFA engine 206 may execute fork instruction 831 to cause NFA engine 206 to store, at an instruction stack, a subsequent fork instruction indicating the second instruction of the second sub-path in response to determining that the current symbol speculatively satisfies the match condition of the first instruction for the first path and the current symbol speculatively satisfies the match condition of the second instruction for the second path. For instance, NFA engine 206 may store, at an instruction stack, a subsequent fork instruction indicating the second instruction of the second sub-path in response to determining that the current symbol speculatively matches CHAR_1 837 and speculatively matches CHAR_2 844.

FIG. 16 is a conceptual diagram illustrating an example join instruction 851 according to the techniques of this disclosure. Opcode 852 specifies a 4-bit identification opcode mechanism for join instruction 851. For instance, opcode 852 may be specified as '4'h4'. LEN_J 853 specifies a number of payload bytes (0-4) to match and consume before the jump. CFG_J 858 specifies a character config for CHAR_{0-3}. CHAR_0 854, CHAR_1 855, and CHARC_3 857 (CHAR_{0-3} 854-857) specify pattern labels to match (and consume) the payload before the jump. If TPJ 859 is set to '0', ADDR_J 860 specifies an external memory address, for instance, for external memory 210 of FIG. 5 and if TPJ 859 is set to '1', ADDR_J 860 specifies a buffer memory address, for instance, for buffer memory 204 of FIG. 5.

In some examples, a thread of NFA engine 206 may execute join instruction 851 to cause NFA engine 206 to determine the current symbol and the one or more subsequent symbols of the payload segment comprise a subset of symbols corresponding to the zero or more pattern labels. For instance, NFA engine 206 may determine the current symbol and the one or more subsequent symbols of the payload segment comprise a subset of symbols corresponding to CHAR_{0-3} 854-857. In this example, join instruction 851 further causes NFA engine 206 to update a program counter to point to the target instruction in response to determining the current symbol and the one or more subsequent symbols of the payload segment comprise the subset of symbols corresponding to the zero or more pattern characters. For instance, NFA engine 206 may update program counter 604A of FIG. 11 to point to ADDR_J 860 in response to determining the current symbol and the one or more subsequent symbols of the payload segment comprise the subset of symbols corresponding to CHAR_{0-3} 854-857.

FIG. 17 is a conceptual diagram illustrating an example assert instruction 861 according to the techniques of this disclosure. Opcode 862 specifies a 4-bit identification opcode mechanism for assert instruction 861. For instance, opcode 862 may be specified as '4'h5'. CAP 863 matches the previous payload byte when set to '1' and matches a current payload byte when set to '0'. CFG_A 864 and Char_A 865 specify a first char (class) to match the payload byte. In some examples, CFG_A 864 and/or CFG_B 873 may be a character, a case insensitive character, or a character class. NEG 866 specifies to negate the assertion result when set to '1'. PIT 867 specifies to pop a current stack if the overall assertion (after any NEG) is true when set to '1'. OFFSET_B 868 specifies an offset assertion of the current payload byte. In some examples, an OFFSET_B 868 set at 11'h7FF specifies a beginning of payload during reverse matching (when OBE 869 is set a '0'). OBE 869 specifies OFFSET_B 868 counts from the end of payload (e.g., reverse matching) when set to '1' and specifies OFFSET_B 868 counts from the beginning of payload (e.g., forward matching) when set to '0'. OBF 870 specifies OFFSET_B is forced to false when set to '1' and specifies a normal offset assertion when set to '0'. CBF 871 specifies CHAR_B 874 is forced to false when set to '1' and a normal char matching when set to '0'. CBP 872 specifies [CFG_B 873, CHAR_B 874] matches the previous payload byte when set to '1' and [CFG_B 873, CHAR_B 874] matches the current payload byte when set to '0'. CFG_B 873 and CHAR_B 874 specify a second char (class) to match the payload byte.

In some examples, a thread of NFA engine 206 may execute assert instruction 861 to cause NFA engine 206 to determine a subset of symbols of a current symbol and one or more subsequent symbols of the payload segment are positioned in a payload segment to correspond to the offset from a boundary of the payload segment. For instance, NFA engine 206 may determine a subset of symbols of a current symbol and one or more subsequent symbols of the payload segment are positioned in the payload segment to correspond to OFFSET_B 868 from a boundary of the payload segment.

In some examples, a thread of NFA engine 206 may execute assert instruction 861 to cause NFA engine 206 to determine a subset of symbols of a current symbol and one or more subsequent symbols of the payload segment are positioned in a payload segment to correspond to presence or absence of the label at the specific position of the payload segment. For instance, NFA engine 206 may determine a subset of symbols of a current symbol and one or more subsequent symbols of the payload segment are positioned in the payload segment to correspond to OFFSET_B 868 from a boundary of the payload segment and correspond to a presence of a label specified by CHAR_A 865 when NEG 866 is '0' or to an absence of the label specified by CHAR_A 865 when NEG 866 is '1'.

Table 1 illustrates an example set of regex assertion patterns that may be implemented by assert instruction 861 in a forward direction.

TABLE 1

Example Implementations of forward regex assertion patterns

| REGEX ASSERTION | IMPLEMENTATION |
| --- | --- |
| ^ w/ 'm' flag (BOL) | ASSERT(OFS_BEG = 0 \| CHAR_PRE = '\n') |
| ^ w/o 'm' flag; \A (BOP) | ASSERT(OFS_BEG = 0) |
| $ w/ 'm' flag (EOL) | ASSERT(OFS_END = 0 \| CHAR_CUR = '\n') |
| $ w/o 'm' flag; \z (EOP) | ASSERT(OFS_END = 0) |
| \Z (EOP or trailing EOL) | M: FORK(M+3) |
| | M+1: ASSERT(OFS_END = 0, PIT=1) |
| | M+2: JOIN M+4 |
| | M+3: ASSERT(CHAR_CUR = '\n' & OFS_END = 1) |
| \< (word begin) | ASSERT(CHAR_CUR = \w & (OFS_BEG = 0 \| CHAR_PRE = \W)) |
| \> (word end) | ASSERT(CHAR_PRE = \w & (OFS_END = 0 \| CHAR_CUR = \W)) |
| \b (word boundary) | M: FORK(M+3) |
| | M+1: ASSERT(CHAR_CUR = \w & (OFS_BEG = 0 \| CHAR_PRE = \W), PIT=1) |
| | M+2: JOIN M+4 |
| | M+3: ASSERT(CHAR_PRE = \w & (OFS_END = 0 \| CHAR_CUR = \W)) |
| \B (not word boundary) | ASSERT(CHAR_CUR = \w & (OFS_BEG = 0 \| CHAR_PRE = \W), NEG=1) |
| | ASSERT(CHAR_PRE = \w & (OFS_END = 0 \| CHAR_CUR = \W), NEG=1) |

Table 2 illustrates an example set of regex assertion patterns that may be implemented by assert instruction 861 in a reverse direction.

TABLE 2

Example Implementations of reverse regex assertion patterns

| REGEX ASSERTION | IMPLEMENTATION |
| --- | --- |
| ^ w/ 'm' flag (BOL) | ASSERT(OFS_BEG = 2047 | CHAR_CUR = '\n') |
| ^ w/o 'm' flag; \A (BOP) | ASSERT(OFS_BEG = 2047) |
| $ w/ 'm' flag (EOL) | ASSERT(OFS_END = 1 | CHAR_PRE = '\n') |
| $ w/o 'm' flag; \z (EOP) | ASSERT(OFS_END = 1) |
| \Z (EOP or trailing EOL) | M: FORK(M+3)<br>M+1: ASSERT(OFS_END = 1, PIT=1)<br>M+2: JOIN M+4<br>M+3: ASSERT(CHAR_PRE = '\n' & OFS_END = 2) |
| \< (word begin) | ASSERT(CHAR_PRE = \w & (OFS_BEG = 2047 | CHAR_CUR = \W)) |
| \> (word end) | ASSERT(CHAR_CUR = \w & (OFS_END = 1 | CHAR_PRE = \W)) |
| \b (word boundary) | M: FORK(M+3)<br>M+1: ASSERT(CHAR_PRE = \w & (OFS_BEG = 2047 | CHAR_CUR = \W), PIT=1)<br>M+2: JOIN M+4<br>M+3: ASSERT(CHAR_CUR = \w & (OFS_END = 1 | CHAR_PRE = \W)) |
| \B (not word boundary) | ASSERT(CHAR_PRE = \w & (OFS_BEG = 2047 | CHAR_CUR = \W), NEG=1)<br>ASSERT(CHAR_CUR = \w & (OFS_END = 1 | CHAR_PRE = \W), NEG=1) |

FIG. 18 is a conceptual diagram illustrating an example capture group instruction 881 according to the techniques of this disclosure. Opcode 882 specifies a 4-bit identification opcode mechanism for capture group instruction 881. For instance, opcode 882 specifies '4'h6'. AFT 883 specifies match chars before the capture group operation when set to '0' and specifies match chars after the capture group operation when set to '1'. CH_CFG 884 specifies a character config for CHAR_CG{0-4} 887. LEN_CG 886 specifies a number of payload bytes (0-5) to match and consume with the capture group operation. CHAR_CG{0-4} 887 specifies pattern characters to match (and consume) the payload with the capture group operation. CG_OP 889 specifies to make a back reference to capture group GRP_N 890 when set to '01', to write the "begin" register of capture group GRP_N 890 when set to '10', and to write the "end" register of capture group GRP_N 890 when set to '11'. GRP_N 890 specifies a capture group register number. USRDAT_CG 888 specifies a 20-bit user data to be written to an NFA result entry if CG_OP 889 is set to '01' (this instruction is a back reference) or capture group GRP_N 890 has an invalid "beginning" or "ending" offset.

In some examples, a thread of NFA engine 206 may execute capture group instruction 881 to cause NFA engine 206 to store an indication (e.g., an offset, actual symbol, etc.) of a subset of symbols of a current symbol and one or more subsequent symbols of a payload segment that defines captured symbols of a capture group. In some examples, the capture group is assigned a capture group register number (e.g., GRP_N 890). For instance, NFA engine 206 may store a subset of symbols of a current symbol and one or more subsequent symbols of a payload segment that defines GRP_N 890. In some examples, NFA engine 206 may execute capture group instruction 881, which is also referred to herein as a "back reference instruction," to output the captured symbols assigned to a captured group register number in response to receiving an indication of the captured group register number. For instance, NFA engine 206 may to output the captured symbols in response to receiving an indication of GRP_N 890.

Figure 19:
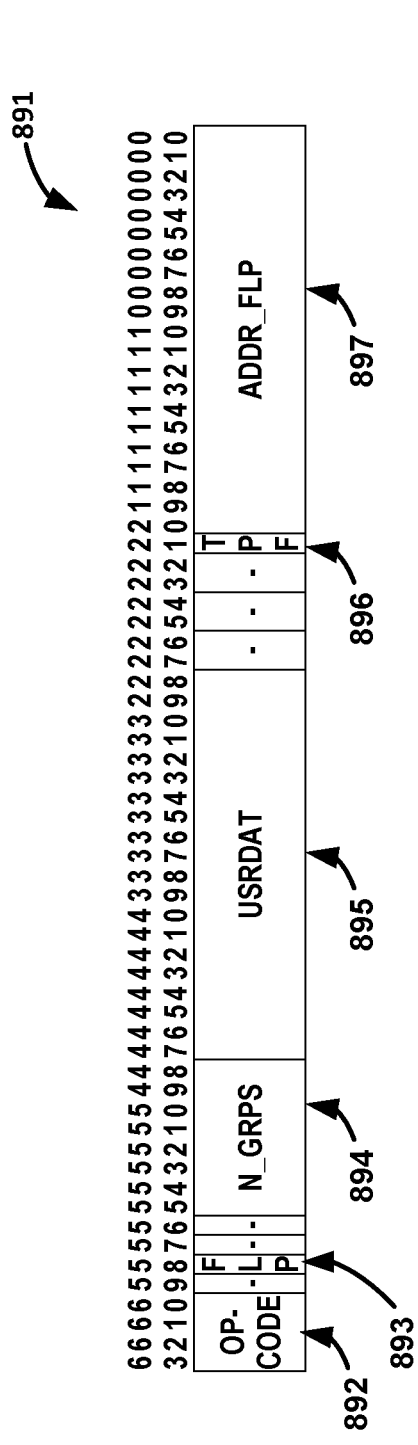
FIG. 19 is a conceptual diagram illustrating an example final instruction according to the techniques of this disclosure.

FIG. 19 is a conceptual diagram illustrating an example final instruction 891 according to the techniques of this disclosure. Opcode 892 specifies a 4-bit identification opcode mechanism for final instruction 891. For instance, opcode 892 specifies '4'h15'. FLP 893 jump to the "flip" target and reverse the payload matching direction when set to '1'. N_GRPS 894 specifies a number of capture groups (from GRP #0) to record in the result buffer. In some examples, N_GRPS 894 is greater than or equal to '0' and less than or equal to '8'. USRDAT 895 specifies a 20-bit user data to be written to the result buffer. ADDR_FLP 897 specifies a target address of the "flip" jump. If TPF 896 is set to '0', ADDR_FLP 897 specifies an external memory address, for instance, for external memory 210 of FIG. 5 and if TPF 896 is set to '1', ADDR_FLP 897 specifies a buffer memory address, for instance, for buffer memory 204 of FIG. 5. In some examples, a thread of NFA engine 206 may execute final instruction 891 to cause NFA engine 206 to output, to a result buffer, an entry indicating a match.

FIG. 20 is a conceptual diagram illustrating an example NFA instruction stack entry 901 according to the techniques of this disclosure. In the example of FIG. 20, opcode 902 specifies a 4-bit identification opcode mechanism for a (partially executed) instruction. REV 904 specifies payload bytes are consumed in increasing offsets when set to '0' and payload bytes are consumed in decreasing offsets when set to '1'. CND 906 specifies a stack entry is not conditional (e.g., always executed) when set to '0' and specifies a stack entry is executed only if the previous stack entry reached a final instruction (e.g., final instruction 891) with FLIP=0 (e.g., FLP 893) when set to '1'. OFFSET 908 specifies an offset of payload byte to be processed by the instruction. ID 914 specifies a stack entry ID.

Instruction stack entry 901 may include information to continue the execution of a partially executed instruction. This may include basic information of the instruction itself, plus some execution context. There may be a "current instruction stack" and a "next instruction stack".

Initially, NFA engine 206 may receive the current instruction stack. NFA engine 206 may process payload by "popping" a current instruction stack entry to continue execution of the current instruction stack that represents at least a portion of an NFA graph. An entry may be pushed onto the current instruction stack when one of multiple paths in an instruction is taken (e.g., in a fork instruction, closure compare instruction, etc.). An entry may be pushed onto the next instruction stack when the end of the payload is reached during processing any instruction. The next instruction stack may be returned by NFA engine 206. Each instruction stack entry may include ID 914. Each stack entry ID 914 identifies a group of the stack entries that belong to the same matching effort, e.g., matching the same regex against the same payload stream (but at alternative matching paths).

The stack entry ID 914 may be originally set by in an instruction in the current instruction stack and may be copied to any matching result or in the instruction next stack. For example, a thread of NFA engine 206 may generate subsequent instructions with a value at ID 914 that corresponds to an instruction being executed by the NFA engine. For instance, a thread of NFA engine 206 may execute a fork instruction to cause NFA engine 206 to store a subsequent fork instruction indicating the second instruction of the second sub-path. In this instance, the fork instruction comprises a value specified at ID 914 for an NFA instruction stack entry of the fork instruction. In this example, to store the subsequent fork, NFA engine 206 is configured to store the additional fork instruction to comprise a value at ID 914 to correspond to the value at ID 914 of the fork instruction. In response to processing a final instruction, NFA engine 206 may remove all entries with a value at ID 914 corresponding to a value specified by an ID 914 of the final instruction. In this way, NFA instruction stack entries may be efficiently removed from an instruction stack.

Various examples have been described. These and other examples are within the scope of the following claims.

What is claimed is:

1. A processing device comprising:
   a memory including a non-deterministic finite automata (NFA) buffer configured to store a plurality of instructions defining an ordered sequence of instructions of at least a portion of an NFA graph, the portion of the NFA graph comprising a plurality of nodes arranged along a plurality of paths; and
   an NFA engine implemented in circuitry, the NFA engine comprising one or more NFA threads implemented in circuitry, each of the NFA threads comprising:
      a program counter storing a value defining a next instruction of the plurality of instructions; and
      a payload offset memory storing a value defining a position of a current symbol in an ordered sequence of symbols of a payload segment of payload data, the NFA engine further comprising a processing unit configured to:
         determine the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises a fork instruction defining a first instruction for a first sub-path for the path and a second instruction for a second sub-path for the path and wherein, to determine the current symbol and the one or more subsequent symbols of the payload segment, the NFA engine is configured to execute the fork instruction, to cause the NFA engine to:
            in response to determining that the current symbol speculatively satisfies a match condition of a first instruction for the first sub-path, update the program counter to point to an instruction of the subset of instructions corresponding to the first sub-path; and
            in response to determining that the current symbol speculatively satisfies the match condition of the second instruction for the second sub-path and the current symbol does not speculatively satisfy the match condition of the first instruction for the first sub-path, update the program counter to point to an instruction of the subset of instructions corresponding to the second sub-path; and
            in response to determining the current symbol and the one or more subsequent symbols of the payload segment that satisfy the match condition, output an indication that the payload data has resulted in a match.

2. The processing device of claim 1, wherein the subset of instructions comprises an array compare instruction defining a character string and wherein, to determine the current symbol and the one or more subsequent symbols of the payload segment, the NFA engine is configured to execute the array compare instruction to cause the NFA engine to:
   determine the current symbol and the one or more subsequent symbols of the payload segment comprise a subset of symbols corresponding to the character string.

3. The processing device of claim 1, wherein the processing device further comprises:
   an instruction stack storing at least a representation of the subset of instructions and wherein the NFA engine is configured to:
      in response to determining that the current symbol speculatively satisfies the match condition of the first instruction for the first sub-path and the current symbol speculatively satisfies the match condition of the second instruction for the second sub-path, store, at the instruction stack, a subsequent fork instruction indicating the second instruction of the second sub-path.

4. The processing device of claim 3, wherein the NFA engine is configured to:
   in response to determining that the current symbol does not speculatively satisfy the match condition of the second instruction for the second sub-path, prune, the second sub-path from the subset of instructions.

5. The processing device of claim 1, further comprising:
   a result buffer, wherein the subset of instructions comprises a final instruction and wherein, to output the indication that the payload data has resulted in the match, the NFA engine is configured to execute the final instruction, to cause the NFA engine to output, to the result buffer, an entry indicating the match and to output one or more captured symbols.

6. The processing device of claim 1, wherein the plurality of instructions comprises a first subset of instructions and a second subset of instructions, the NFA buffer storing the first subset of instructions, the processing device further comprising an interface to external memory, the external memory storing at least the second subset of instructions, the second subset being different than the first subset.

7. The processing device of claim 6, wherein the NFA engine is configured to:
   prefetch the second subset of instructions when executing the first subset of instructions.

8. The processing device of claim 1, wherein the NFA engine comprises one of a plurality of NFA engines.

9. The processing device of claim 1, further comprising an NFA programming interface configured to at least one of:
   load the plurality of instructions into the NFA buffer;
   unload the plurality of instructions from the NFA buffer; or
   receive the payload data.

10. The processing device of claim 9, wherein the NFA programming interface is configured to load the plurality of instructions into the NFA buffer from memory external to the processing device.

11. The processing device of claim 9, wherein the NFA programming interface is configured to at least one of:
   receive an NFA load work unit comprising instructions to load the plurality of instructions into the NFA buffer;
   receive an NFA unload work unit comprising instructions to unload the plurality of instructions from the NFA buffer; or
   receive an NFA search work unit comprising one or more instructions to receive the payload data, and wherein in response to receiving the NFA search work unit, the NFA engine is configured to:
   select an idle NFA thread of the one or more NFA threads;

load the plurality of instructions;
determine a start instruction of the plurality of instructions; and
initialize the value of the payload offset to correspond to an ordinal first symbol of the sequence of symbols.

12. The processing device of claim 1, wherein the plurality of instructions represents a set of one or more regular expressions used in at least one of virus detection, intrusion detection, intrusion prevention, search, or indexing.

13. The processing device of claim 1, wherein each of the plurality of instructions is specified by an indication of an operation code.

14. A processing device comprising:
a memory including a non-deterministic finite automata (NFA) buffer configured to store a plurality of instructions defining an ordered sequence of instructions of at least a portion of an NFA graph, the portion of the NFA graph comprising a plurality of nodes arranged along a plurality of paths; and
an NFA engine implemented in circuitry, the NFA engine comprising one or more NFA threads implemented in circuitry, each of the NFA threads comprising:
  a program counter storing a value defining a next instruction of the plurality of instructions; and
  a payload offset memory storing a value defining a position of a current symbol in an ordered sequence of symbols of a payload segment of payload data, the NFA engine further comprising a processing unit configured to:
    determine the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises a closure compare instruction defining a single label, a threshold range of repetitions of the single label, and a pattern label, wherein the single label comprises one or more case sensitive characters, one or more case insensitive characters, or a character class, and wherein, to determine the current symbol and the one or more subsequent symbols of the payload segment, the NFA engine is configured to execute the closure compare instruction, to cause the NFA engine to determine the current symbol and the one or more subsequent symbols comprise a subset of symbols corresponding to the single label for the threshold range of symbols and the pattern label speculatively matches a symbol immediately following the one or more subsequent symbols; and
    in response to determining the current symbol and the one or more subsequent symbols of the payload segment that satisfy the match condition, output an indication that the payload data has resulted in a match.

15. A processing device comprising:
a memory including a non-deterministic finite automata (NFA) buffer configured to store a plurality of instructions defining an ordered sequence of instructions of at least a portion of an NFA graph, the portion of the NFA graph comprising a plurality of nodes arranged along a plurality of paths; and
an NFA engine implemented in circuitry, the NFA engine comprising one or more NFA threads implemented in circuitry, each of the NFA threads comprising:
  a program counter storing a value defining a next instruction of the plurality of instructions; and
  a payload offset memory storing a value defining a position of a current symbol in an ordered sequence of symbols of a payload segment of payload data, the NFA engine further comprising a processing unit configured to:
    determine the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises a join instruction defining zero or more pattern labels to match and an indication of a target instruction, wherein the zero or more pattern labels comprise one or more case sensitive characters, one or more case insensitive characters, or a character class and wherein, to determine the current symbol and the one or more subsequent symbols of the payload segment, the NFA engine is configured to execute the join instruction, to cause the NFA engine to:
      determine the current symbol and the one or more subsequent symbols of the payload segment comprise a subset of symbols corresponding to the zero or more pattern labels; and
      in response to determining the current symbol and the one or more subsequent symbols of the payload segment comprise the subset of symbols corresponding to the zero or more pattern labels, update the program counter to point to the target instruction; and
    in response to determining the current symbol and the one or more subsequent symbols of the payload segment that satisfy the match condition, output an indication that the payload data has resulted in a match.

16. A processing device comprising:
a memory including a non-deterministic finite automata (NFA) buffer configured to store a plurality of instructions defining an ordered sequence of instructions of at least a portion of an NFA graph, the portion of the NFA graph comprising a plurality of nodes arranged along a plurality of paths; and
an NFA engine implemented in circuitry, the NFA engine comprising one or more NFA threads implemented in circuitry, each of the NFA threads comprising:
  a program counter storing a value defining a next instruction of the plurality of instructions; and
  a payload offset memory storing a value defining a position of a current symbol in an ordered sequence of symbols of a payload segment of payload data, the NFA engine further comprising a processing unit configured to:
    determine the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises an assert instruction defining an offset from a boundary of the payload segment and wherein, to determine the current symbol and the one or more subsequent symbols of the payload segment, the NFA engine is configured to execute the assert instruction, to cause the NFA engine to determine a subset of symbols of the current symbol and the one or more subsequent symbols of the payload segment are positioned in the payload segment to correspond to the offset from a boundary of the payload segment; and in response to determining the current symbol and the one or more subsequent symbols of the payload segment that satisfy the match condition, output an indication that the payload data has resulted in a match.

17. A processing device comprising:
a memory including a non-deterministic finite automata (NFA) buffer configured to store a plurality of instructions defining an ordered sequence of instructions of at least a portion of an NFA graph, the portion of the NFA graph comprising a plurality of nodes arranged along a plurality of paths; and
an NFA engine implemented in circuitry, the NFA engine comprising one or more NFA threads implemented in circuitry, each of the NFA threads comprising:
a program counter storing a value defining a next instruction of the plurality of instructions; and
a payload offset memory storing a value defining a position of a current symbol in an ordered sequence of symbols of a payload segment of payload data, the NFA engine further comprising a processing unit configured to:
determine the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises an assert instruction defining a presence or an absence of a label at a specific position of the payload segment, wherein the label comprises one or more case sensitive characters, one or more case insensitive characters, or a character class, and wherein, to determine the current symbol and the one or more subsequent symbols of the payload segment, the NFA engine is configured to execute the assert instruction, to cause the NFA engine to determine a subset of symbols of the current symbol and the one or more subsequent symbols of the payload segment are positioned in the payload segment to correspond to the presence or absence of the label at the specific position of the payload segment; and in response to determining the current symbol and the one or more subsequent symbols of the payload segment that satisfy the match condition, output an indication that the payload data has resulted in a match.

18. The processing device of claim 17, wherein the assert instruction specifies forward matching or reverse matching, wherein the specific position indicates a position in the payload segment relative to a beginning of the payload segment when the assert instruction specifies forward matching and wherein the specific position indicates a position in the payload segment relative to an end of the payload segment when the assert instruction specifies reverse matching.

19. A processing device comprising:
a memory including a non-deterministic finite automata (NFA) buffer configured to store a plurality of instructions defining an ordered sequence of instructions of at least a portion of an NFA graph, the portion of the NFA graph comprising a plurality of nodes arranged along a plurality of paths; and
an NFA engine implemented in circuitry, the NFA engine comprising one or more NFA threads implemented in circuitry, each of the NFA threads comprising:
a program counter storing a value defining a next instruction of the plurality of instructions; and
a payload offset memory storing a value defining a position of a current symbol in an ordered sequence of symbols of a payload segment of payload data, the NFA engine further comprising a processing unit configured to:
determine the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises a capture group instruction wherein, to determine the current symbol and the one or more subsequent symbols of the payload segment, the NFA engine is configured to execute the capture group instruction, to cause the NFA engine to store an indication of a subset of symbols of the current symbol and the one or more subsequent symbols of the payload segment that defines captured symbols of a capture group, wherein the capture group is assigned a capture group register number; and in response to determining the current symbol and the one or more subsequent symbols of the payload segment that satisfy the match condition, output an indication that the payload data has resulted in a match.

20. A processing device comprising:
a memory including a non-deterministic finite automata (NFA) buffer configured to store a plurality of instructions defining an ordered sequence of instructions of at least a portion of an NFA graph, the portion of the NFA graph comprising a plurality of nodes arranged along a plurality of paths; and
an NFA engine implemented in circuitry, the NFA engine comprising one or more NFA threads implemented in circuitry, each of the NFA threads comprising:
a program counter storing a value defining a next instruction of the plurality of instructions; and
a payload offset memory storing a value defining a position of a current symbol in an ordered sequence of symbols of a payload segment of payload data, the NFA engine further comprising a processing unit configured to:
determine the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises a back reference instruction and wherein the NFA engine is configured to execute the back reference instruction to cause the NFA engine to in response to receiving an indication of a capture group register number, output captured symbols of a capture group assigned to the capture group register number; and in response to determining the current symbol and the one or more subsequent symbols of the payload segment that satisfy the match condition, output an indication that the payload data has resulted in a match.

21. A processing device comprising:
a memory including a non-deterministic finite automata (NFA) buffer configured to store a first subset of instructions of a plurality of instructions defining an ordered sequence of instructions of at least a portion of an NFA graph, the portion of the NFA graph comprising a plurality of nodes arranged along a plurality of paths;
an interface to external memory, the external memory being configured to store at least a second subset of instructions of the plurality of instructions, the second subset being different than the first subset; and
an NFA engine implemented in circuitry, the NFA engine comprising one or more NFA threads implemented in circuitry, each of the NFA threads comprising:
a program counter storing a value defining a next instruction of the plurality of instructions; and
a payload offset memory storing a value defining a position of a current symbol in an ordered sequence of symbols of a payload segment of payload data, the NFA engine further comprising a processing unit configured to:
determine the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions; and
in response to determining the current symbol and the one or more subsequent symbols of the payload segment that satisfy the match condition, output an indication that the payload data has resulted in a match, wherein the NFA engine is configured to:
evict one or more first instructions from a cache for the NFA engine to the NFA buffer based on when the one or more first instructions were least recently used; and
evict one or more second instructions from the NFA buffer to the external memory based on when the one or more second instructions were least recently used.

22. A method comprising:
storing, by a non-deterministic finite automata (NFA) engine of a processing device, the NFA engine implemented in circuitry, a plurality of instructions defining an ordered sequence of instructions of at least a portion of an NFA graph, the portion of the NFA graph comprising a plurality of nodes arranged along a plurality of paths;

determining, by an NFA thread of the NFA engine, the NFA thread implemented in circuitry, a value defining a next instruction of the plurality of instructions;
determining, by the NFA thread, a value defining a position of a current symbol in an ordered sequence of symbols of a payload segment of payload data;
determining, by the NFA engine, the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises a fork instruction defining a first instruction for a first sub-path for the path and a second instruction for a second sub-path for the path and wherein determining the current symbol and the one or more subsequent symbols of the payload segment comprises:
in response to determining that the current symbol speculatively satisfies a match condition of a first instruction for the first sub-path, updating the program counter to point to an instruction of the subset of instructions corresponding to the first sub-path; and
in response to determining that the current symbol speculatively satisfies the match condition of the second instruction for the second sub-path and the current symbol does not speculatively satisfy the match condition of the first instruction for the first sub-path, updating the program counter to point to an instruction of the subset of instructions corresponding to the second sub-path; and
in response to determining the current symbol and the one or more subsequent symbols of the payload segment that satisfy the match condition, outputting, by the NFA engine, an indication that the payload data has resulted in a match.

23. The method of claim 22, wherein the subset of instructions comprises an array compare instruction defining a character string and wherein determining the current symbol and the one or more subsequent symbols of the payload segment comprises determining the current symbol and the one or more subsequent symbols of the payload segment comprise a subset of symbols corresponding to the character string.

24. The method of claim 22, further comprising:
in response to determining that the current symbol speculatively satisfies the match condition of the first instruction for the first sub-path and the current symbol speculatively satisfies the match condition of the second instruction for the second sub-path, storing, at an instruction stack, a subsequent fork instruction indicating the second instruction of the second sub-path.

25. The method of claim 24, further comprising:
in response to determining that the current symbol does not speculatively satisfy the match condition of the second instruction for the second sub-path, pruning, the second sub-path from the subset of instructions.

26. The method of claim 22, wherein the subset of instructions comprises a final instruction and wherein outputting the indication that the payload data has resulted in the match comprises outputting, to a result buffer, an entry indicating the match and outputting one or more captured symbols.

27. The method of claim 22, wherein the plurality of instructions comprises a first subset of instructions and a second subset of instructions and wherein storing the plurality of instructions comprises storing the first subset of instructions in an NFA buffer and storing the second subset of instructions in external memory, the second subset being different than the first subset.

28. The method of claim 27, further comprising:
prefetching the second subset of instructions when executing the first subset of instructions.

29. The method of claim 22, wherein the NFA engine comprises one of a plurality of NFA engines.

30. The method of any combination of claim 22, further comprising at least one of:
loading the plurality of instructions;
unloading the plurality of instructions; or
receiving the payload data.

31. The method of claim 30, wherein loading the plurality of instructions comprises loading the plurality of instructions from memory external to the processing device.

32. The method of claim 30, further comprising at least one of:
receiving an NFA load work unit comprising instructions to load the plurality of instructions;
receiving an NFA unload work unit comprising instructions to unload the plurality of instructions; or
receiving an NFA search work unit comprising one or more instructions to receive the payload data, and wherein in response to receiving the NFA search work unit:
selecting an idle NFA thread of the one or more NFA threads;
loading the plurality of instructions;
determining a start instruction of the plurality of instructions; and
initializing the value of the payload offset to correspond to an ordinal first symbol of the sequence of symbols.

33. The method of claim 22, wherein the plurality of instructions represents a set of one or more regular expressions used in at least one of virus detection, intrusion detection, intrusion prevention, search, or indexing.

34. The method of claim 22, wherein each of the plurality of instructions is specified by an indication of an operation code.

35. A method comprising:
storing, by a non-deterministic finite automata (NFA) engine of a processing device, the NFA engine implemented in circuitry, a plurality of instructions defining an ordered sequence of instructions of at least a portion of an NFA graph, the portion of the NFA graph comprising a plurality of nodes arranged along a plurality of paths;
determining, by an NFA thread of the NFA engine, the NFA thread implemented in circuitry, a value defining a next instruction of the plurality of instructions;
determining, by the NFA thread, a value defining a position of a current symbol in an ordered sequence of symbols of a payload segment of payload data;
determining, by the NFA engine, the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises a closure compare instruction defining a single label, a threshold range of repetitions of the single label, and a pattern label, wherein the single label comprises one or more case sensitive characters, one or more case insensitive characters, or a character class, and wherein determining the current symbol and the one or more subsequent symbols of the payload segment comprises determining the current symbol and the one or more subsequent symbols comprise a subset of symbols corresponding to the single label for the threshold range of symbols and the pattern label speculatively matches a symbol immediately following the one or more subsequent symbols; and
in response to determining the current symbol and the one or more subsequent symbols of the payload segment that satisfy the match condition, outputting, by the NFA engine, an indication that the payload data has resulted in a match.

36. A method comprising:
storing, by a non-deterministic finite automata (NFA) engine of a processing device, the NFA engine implemented in circuitry, a plurality of instructions defining an ordered sequence of instructions of at least a portion of an NFA graph, the portion of the NFA graph comprising a plurality of nodes arranged along a plurality of paths;
determining, by an NFA thread of the NFA engine, the NFA thread implemented in circuitry, a value defining a next instruction of the plurality of instructions;
determining, by the NFA thread, a value defining a position of a current symbol in an ordered sequence of symbols of a payload segment of payload data;
determining, by the NFA engine, the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises a join instruction defining zero or more pattern labels to match and an indication of a target instruction, wherein the zero or more pattern labels comprises one or more case sensitive characters, one or more case insensitive characters, or a character class, and wherein determining the current symbol and the one or more subsequent symbols of the payload segment comprises:
determining the current symbol and the one or more subsequent symbols of the payload segment comprise a subset of symbols corresponding to the zero or more pattern labels; and
in response to determining the current symbol and the one or more subsequent symbols of the payload segment comprise the subset of symbols corresponding to the zero or more pattern labels, updating the program counter to point to the target instruction; and
in response to determining the current symbol and the one or more subsequent symbols of the payload segment that satisfy the match condition, outputting, by the NFA engine, an indication that the payload data has resulted in a match.

37. A method comprising:
storing, by a non-deterministic finite automata (NFA) engine of a processing device, the NFA engine implemented in circuitry, a plurality of instructions defining an ordered sequence of instructions of at least a portion of an NFA graph, the portion of the NFA graph comprising a plurality of nodes arranged along a plurality of paths;

determining, by an NFA thread of the NFA engine, the NFA thread implemented in circuitry, a value defining a next instruction of the plurality of instructions;

determining, by the NFA thread, a value defining a position of a current symbol in an ordered sequence of symbols of a payload segment of payload data;

determining, by the NFA engine, the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises an assert instruction defining an offset from a boundary of the payload segment and wherein determining the current symbol and the one or more subsequent symbols of the payload segment comprises determining a subset of symbols of the current symbol and the one or more subsequent symbols of the payload segment are positioned in the payload segment to correspond to the offset from a boundary of the payload segment; and in response to determining the current symbol and the one or more subsequent symbols of the payload segment that satisfy the match condition, outputting, by the NFA engine, an indication that the payload data has resulted in a match.

38. A method comprising:

storing, by a non-deterministic finite automata (NFA) engine of a processing device, the NFA engine implemented in circuitry, a plurality of instructions defining an ordered sequence of instructions of at least a portion of an NFA graph, the portion of the NFA graph comprising a plurality of nodes arranged along a plurality of paths;

determining, by an NFA thread of the NFA engine, the NFA thread implemented in circuitry, a value defining a next instruction of the plurality of instructions;

determining, by the NFA thread, a value defining a position of a current symbol in an ordered sequence of symbols of a payload segment of payload data;

determining, by the NFA engine, the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises an assert instruction defining a presence or an absence of a label at a specific position of the payload segment, wherein the label comprises one or more case sensitive characters, one or more case insensitive characters, or a character class, and wherein determining the current symbol and the one or more subsequent symbols of the payload segment comprises determining a subset of symbols of the current symbol and the one or more subsequent symbols of the payload segment are positioned in the payload segment to correspond to the presence or absence of the label at the specific position of the payload segment; and in response to determining the current symbol and the one or more subsequent symbols of the payload segment that satisfy the match condition, outputting, by the NFA engine, an indication that the payload data has resulted in a match.

39. The method of claim 37, wherein the assert instruction specifies forward matching or reverse matching, wherein the specific position indicates a position in the payload segment relative to a beginning of the payload segment when the assert instruction specifies forward matching and wherein the specific position indicates a position in the payload segment relative to an end of the payload segment when the assert instruction specifies negative matching.

40. A method comprising:

storing, by a non-deterministic finite automata (NFA) engine of a processing device, the NFA engine implemented in circuitry, a plurality of instructions defining an ordered sequence of instructions of at least a portion of an NFA graph, the portion of the NFA graph comprising a plurality of nodes arranged along a plurality of paths;

determining, by an NFA thread of the NFA engine, the NFA thread implemented in circuitry, a value defining a next instruction of the plurality of instructions;

determining, by the NFA thread, a value defining a position of a current symbol in an ordered sequence of symbols of a payload segment of payload data;

determining, by the NFA engine, the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises a capture group instruction and wherein determining the current symbol and the one or more subsequent symbols of the payload segment comprises storing an indication of a subset of symbols of the current symbol and the one or more subsequent symbols of the payload segment that defines captured symbols of a capture group, wherein the capture group is assigned a capture group register number; and in response to determining the current symbol and the one or more subsequent symbols of the payload segment that satisfy the match condition, outputting, by the NFA engine, an indication that the payload data has resulted in a match.

41. A method comprising:

storing, by a non-deterministic finite automata (NFA) engine of a processing device, the NFA engine implemented in circuitry, a plurality of instructions defining an ordered sequence of instructions of at least a portion of an NFA graph, the portion of the NFA graph comprising a plurality of nodes arranged along a plurality of paths;

determining, by an NFA thread of the NFA engine, the NFA thread implemented in circuitry, a value defining a next instruction of the plurality of instructions;

determining, by the NFA thread, a value defining a position of a current symbol in an ordered sequence of symbols of a payload segment of payload data;

determining, by the NFA engine, the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions, wherein the subset of instructions comprises a back reference instruction;

in response to determining the current symbol and the one or more subsequent symbols of the payload segment that satisfy the match condition, outputting, by the NFA engine, an indication that the payload data has resulted in a match; and in response to receiving an indication of a capture group register number, outputting captured symbols of a capture group assigned to the capture group register number.

42. A method comprising:

storing, by a non-deterministic finite automata (NFA) engine of a processing device, the NFA engine implemented in circuitry, a plurality of instructions defining an ordered sequence of instructions of at least a portion of an NFA graph, the portion of the NFA graph comprising a plurality of nodes arranged along a plurality of paths, wherein the plurality of instructions comprises a first subset of instructions and a second subset of instructions and wherein storing the plurality of instructions comprises storing the first subset of instructions in an NFA buffer and storing the second subset of instructions in external memory, the second subset being different than the first subset;

determining, by an NFA thread of the NFA engine, the NFA thread implemented in circuitry, a value defining a next instruction of the plurality of instructions;

determining, by the NFA thread, a value defining a position of a current symbol in an ordered sequence of symbols of a payload segment of payload data;

determining, by the NFA engine, the current symbol and one or more subsequent symbols of the payload segment that satisfy a match condition specified by a subset of instructions of the plurality of instructions for a path of the plurality of paths, the subset of instructions comprising the next instruction and one or more subsequent instructions of the plurality of instructions; and in response to determining the current symbol and the one or more subsequent symbols of the payload segment that satisfy the match condition, outputting, by the NFA engine, an indication that the payload data has resulted in a match evicting one or more first instructions from a cache for the NFA engine to the NFA buffer based on when the one or more first instructions were least recently used; and evicting one or more second instructions from the NFA buffer to the external memory based on when the one or more second instructions were least recently used.

* * * * *

UNITED STATES PATENT AND TRADEMARK OFFICE
CERTIFICATE OF CORRECTION

PATENT NO. : 10,656,949 B2  
APPLICATION NO. : 16/035478  
DATED : May 19, 2020  
INVENTOR(S) : Satyanarayana Lakshmipathi Billa et al.

It is certified that error appears in the above-identified patent and that said Letters Patent is hereby corrected as shown below:

In the Claims

Column 42, Line 1 (Claim 39) Replace "The method of claim 37" with --The method of claim 38--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*